(12) United States Patent
Yoon et al.

(10) Patent No.: US 12,117,628 B2
(45) Date of Patent: Oct. 15, 2024

(54) DIFFRACTION LIGHT GUIDE PLATE AND METHOD OF MANUFACTURING DIFFRACTION LIGHT GUIDE PLATE

(71) Applicant: LG CHEM, LTD., Seoul (KR)

(72) Inventors: Jung Hwan Yoon, Daejeon (KR); Bu Gon Shin, Daejeon (KR); Jeong Ho Park, Daejeon (KR); Eun Kyu Her, Daejeon (KR); So Young Choo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 388 days.

(21) Appl. No.: 16/644,642

(22) PCT Filed: Sep. 12, 2018

(86) PCT No.: PCT/KR2018/010703
§ 371 (c)(1),
(2) Date: Mar. 5, 2020

(87) PCT Pub. No.: WO2019/054756
PCT Pub. Date: Mar. 21, 2019

(65) Prior Publication Data
US 2021/0063619 A1    Mar. 4, 2021

(30) Foreign Application Priority Data
Sep. 12, 2017   (KR) .......................... 10-2017-0116701

(51) Int. Cl.
*G02B 5/18*    (2006.01)
*F21V 8/00*    (2006.01)

(52) U.S. Cl.
CPC ......... *G02B 5/1842* (2013.01); *G02B 6/0023* (2013.01); *G02B 6/005* (2013.01)

(58) Field of Classification Search
CPC ..... G02B 5/1842; G02B 6/0023; G02B 6/005
See application file for complete search history.

(56) References Cited

U.S. PATENT DOCUMENTS

| | | | |
|---|---|---|---|
| 5,835,643 A * | 11/1998 | Fukumoto | G02F 1/335 385/36 |
| 7,361,878 B2 * | 4/2008 | Kobayashi | G02B 27/142 349/196 |
| 7,763,841 B1 | 7/2010 | McEldowney | |
| 2002/0076154 A1 * | 6/2002 | Maisenhoelder | G02B 6/136 385/12 |
| 2002/0127497 A1 * | 9/2002 | Brown | G02B 1/02 359/566 |
| 2011/0267487 A1 * | 11/2011 | Yamagata | H01L 27/14627 359/569 |
| 2013/0063815 A1 | 3/2013 | Kubota | |
| 2016/0116739 A1 * | 4/2016 | TeKolste | G02B 6/0026 385/36 |
| 2016/0124229 A1 | 5/2016 | Yokoyama | |

(Continued)

FOREIGN PATENT DOCUMENTS

| | | | | |
|---|---|---|---|---|
| CN | 104460115 B * | 9/2017 | ............. | G02B 27/22 |
| JP | 3-246510 A | 11/1991 | | |

(Continued)

*Primary Examiner* — Fatima N Farokhrooz
(74) *Attorney, Agent, or Firm* — Bryan Cave Leighton Paisner LLP

(57) ABSTRACT

A smaller and lighter diffraction light guide plate, and a method of manufacturing the same.

10 Claims, 13 Drawing Sheets

(56) References Cited

U.S. PATENT DOCUMENTS

| | | | |
|---|---|---|---|
| 2016/0216416 A1 | 7/2016 | Tekolste et al. | |
| 2016/0370582 A1* | 12/2016 | Watanabe | G02B 5/1861 |
| 2017/0003504 A1* | 1/2017 | Vallius | G02B 5/1852 |
| 2017/0131552 A1* | 5/2017 | Yokoyama | G02B 5/1866 |
| 2017/0235142 A1 | 8/2017 | Wall et al. | |
| 2017/0276957 A1* | 9/2017 | Matsuki | G02B 27/0172 |
| 2018/0052501 A1* | 2/2018 | Jones, Jr. | G06F 3/013 |
| 2018/0129060 A1* | 5/2018 | Lee | G02B 6/0036 |
| 2018/0143438 A1* | 5/2018 | Oh | G02B 27/4261 |

FOREIGN PATENT DOCUMENTS

| | | | |
|---|---|---|---|
| JP | 10-69673 A | 3/1998 | |
| JP | 2010040415 A | 2/2010 | |
| JP | 2013057782 A | 3/2013 | |
| JP | 2015-99238 A | 5/2015 | |
| JP | 2015-102613 A | 6/2015 | |
| JP | 2017056388 A | 3/2017 | |
| JP | 2017-156388 A | 9/2017 | |
| JP | 2017-531840 A | 10/2017 | |
| KR | 2015049376 A | 3/2015 | |
| KR | 20150086416 * | 7/2015 | ....... G02F 1/133615 |
| KR | 10-2015-012000 A | 10/2015 | |
| KR | 2016177232 A | 10/2016 | |
| WO | 2017/120341 A1 | 7/2017 | |

* cited by examiner

[Figure 1A]
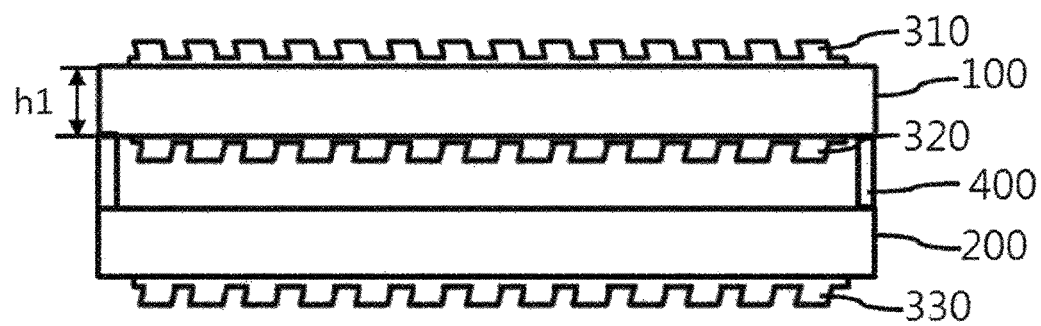
[Figure 1B]
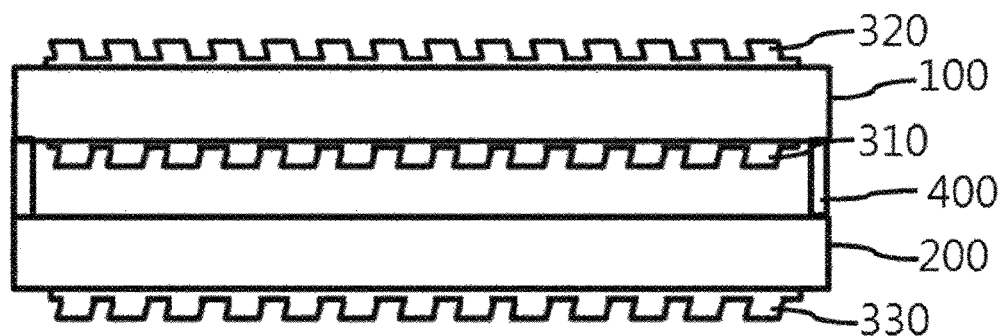
[Figure 1C]
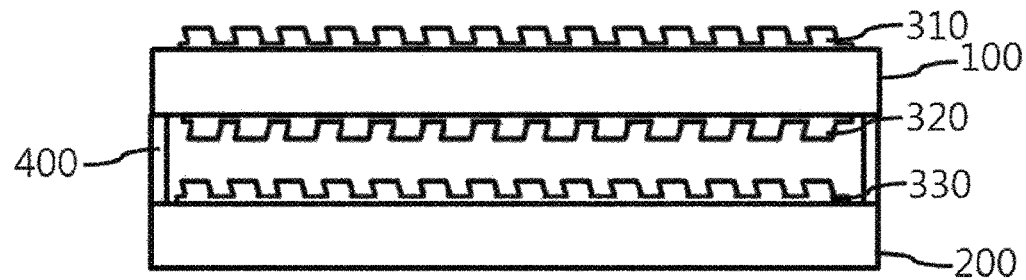

[Figure 1D]
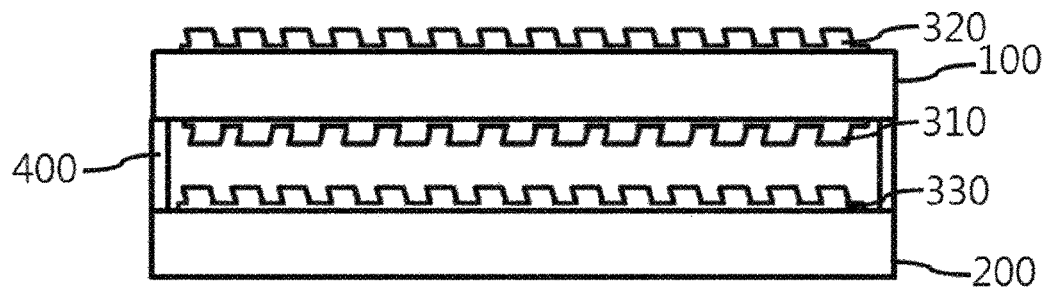

[Figure 2A]
(1)
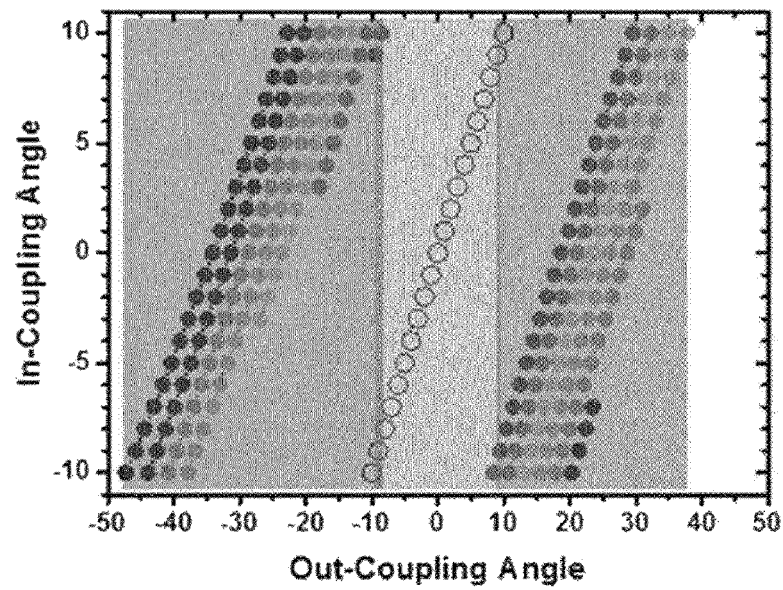
(2)
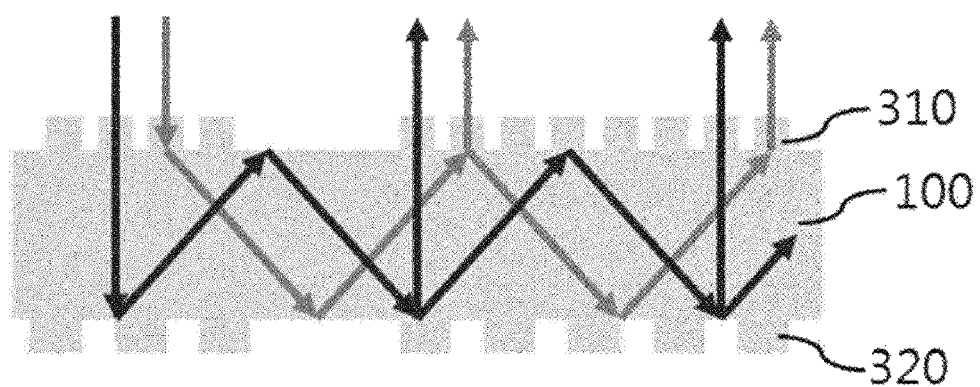

[Figure 2B]
(1)
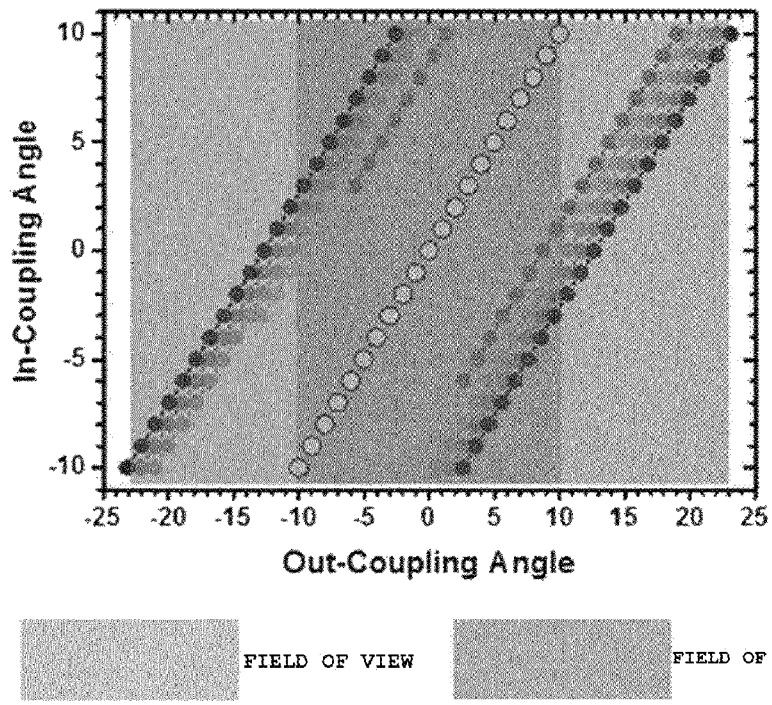
(2)
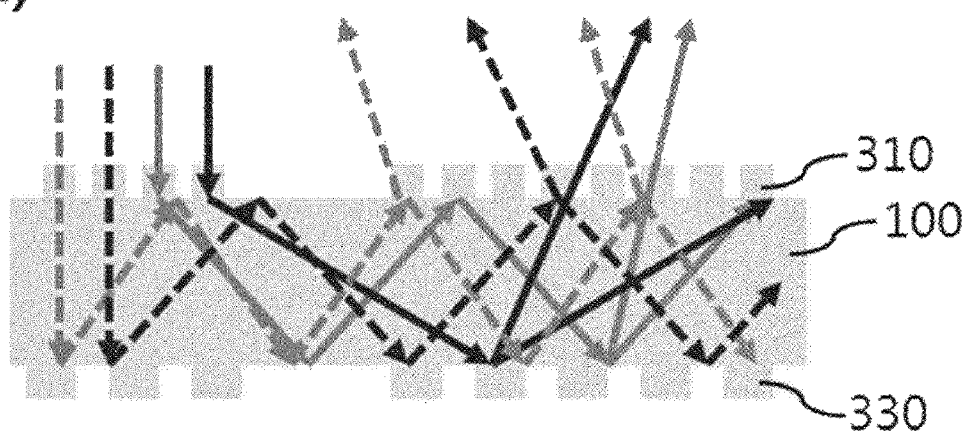

[Figure 3]
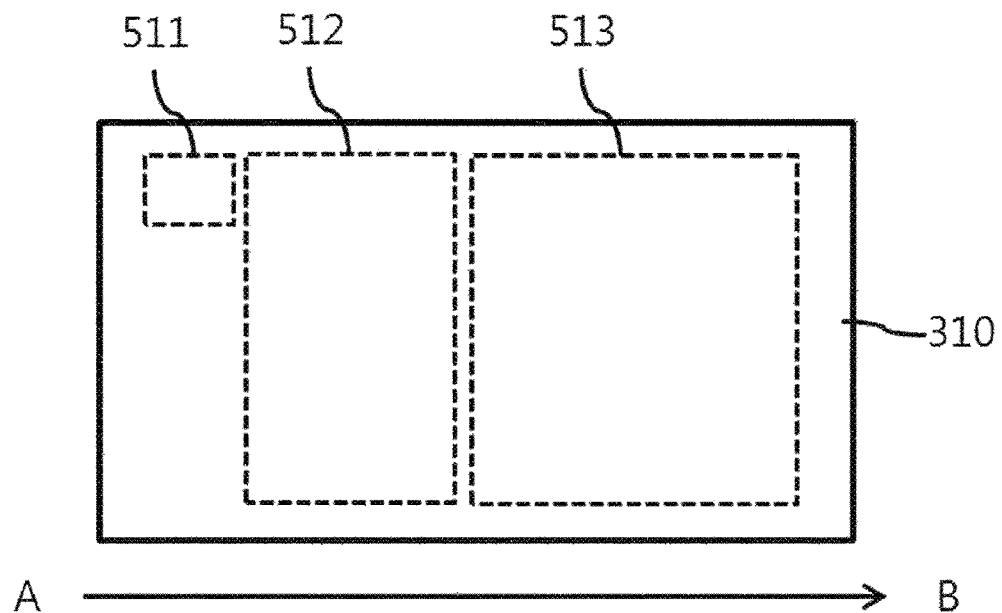
A ⟶ B
[Figure 4]
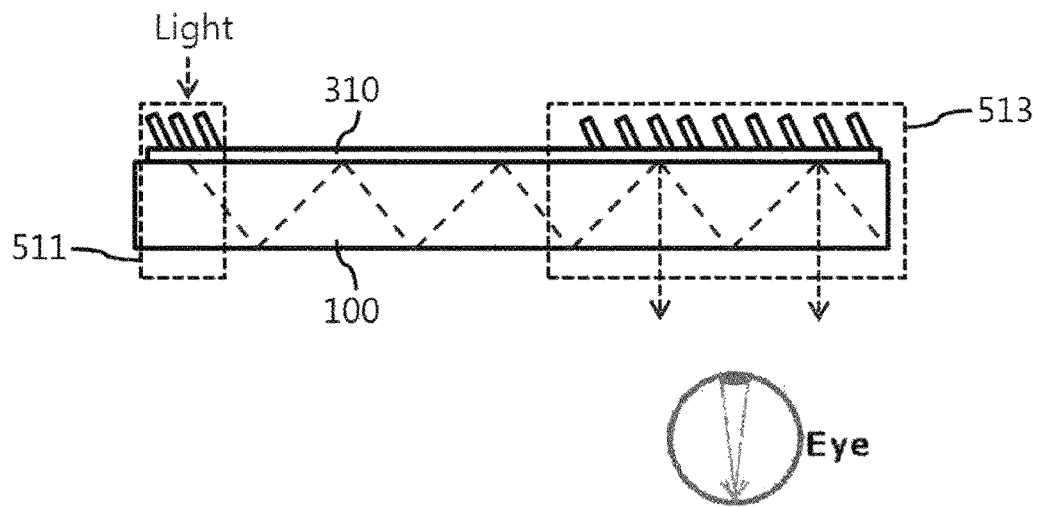

[Figure 5]
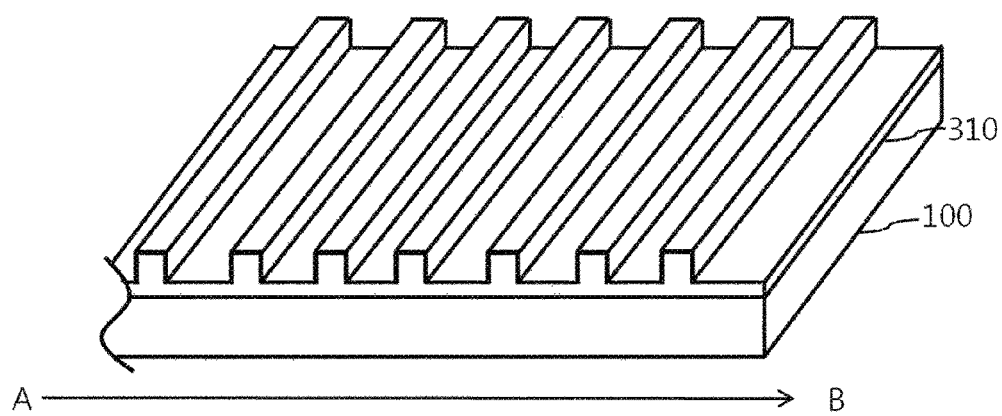
A → B
[Figure 6]
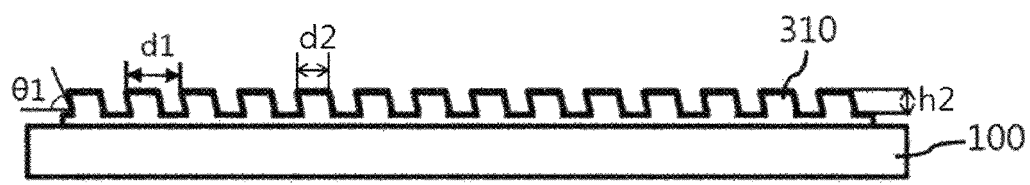

[Figure 8A]
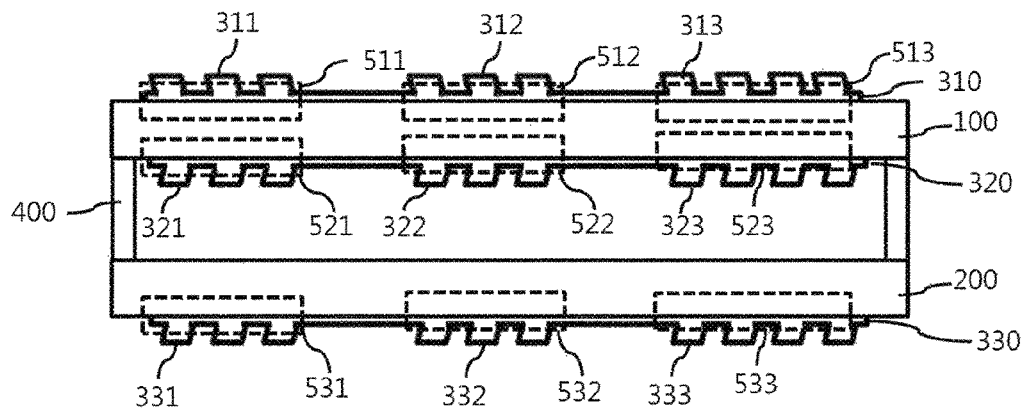
[Figure 8B]
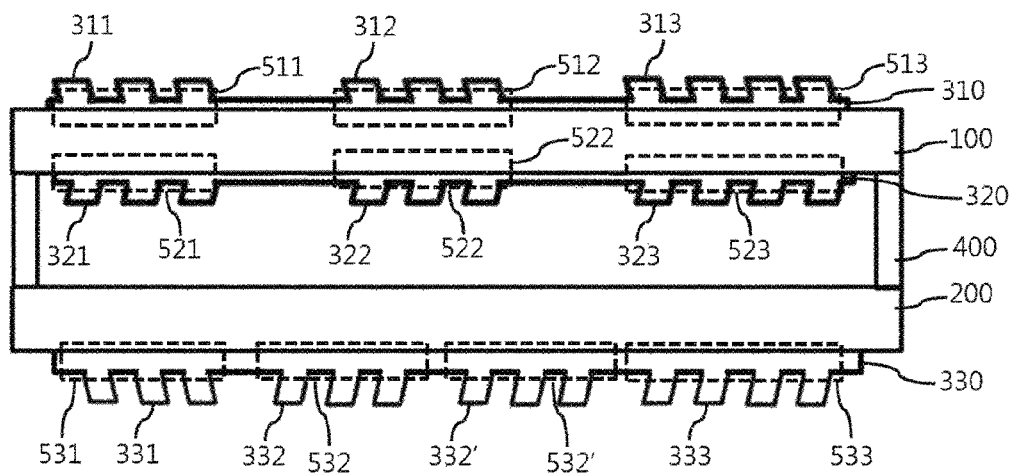

[Figure 9]
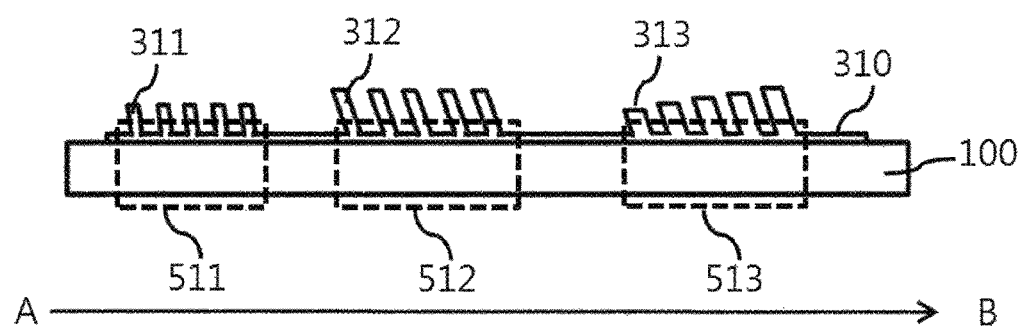

[Figure 10]
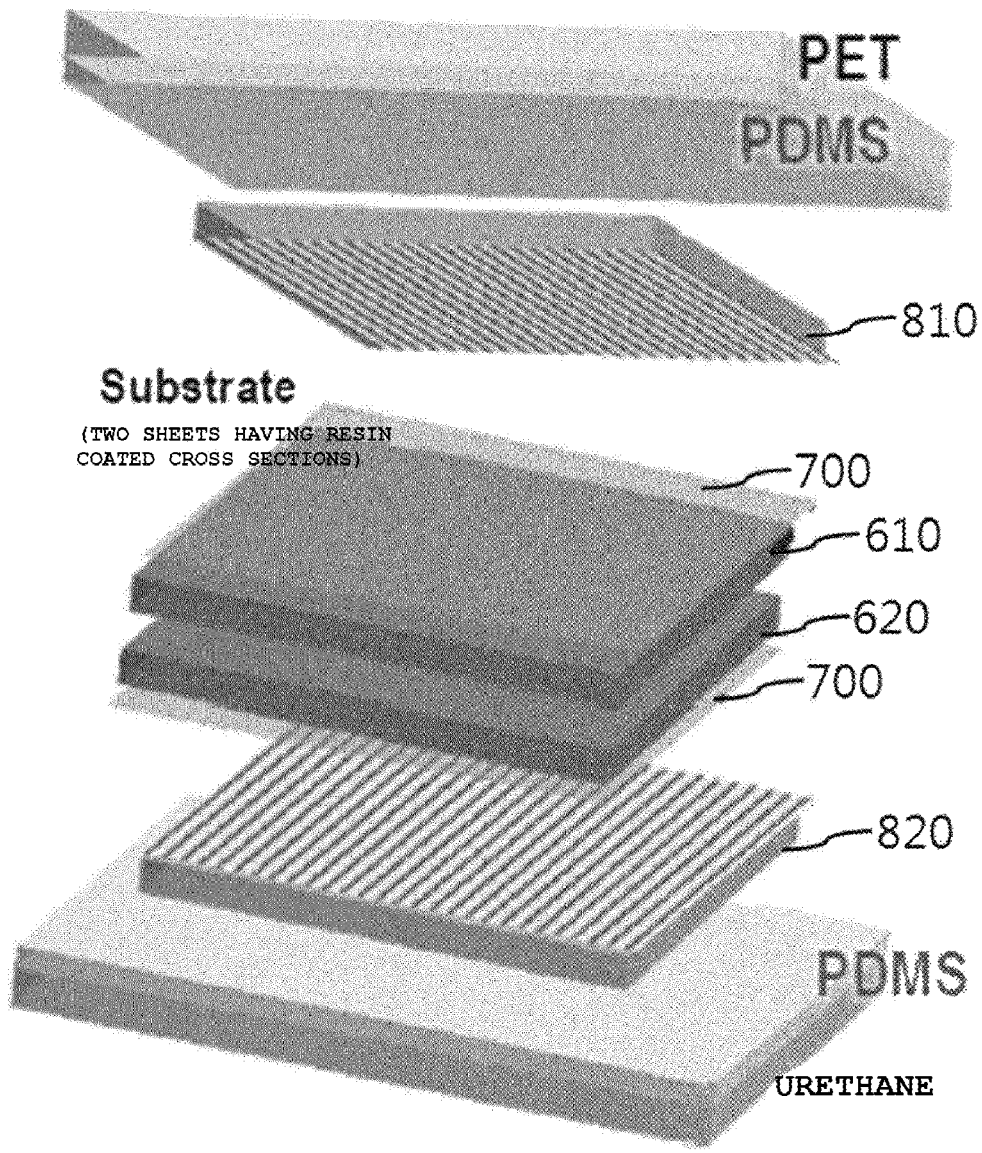

[Figure 11A]
(A)
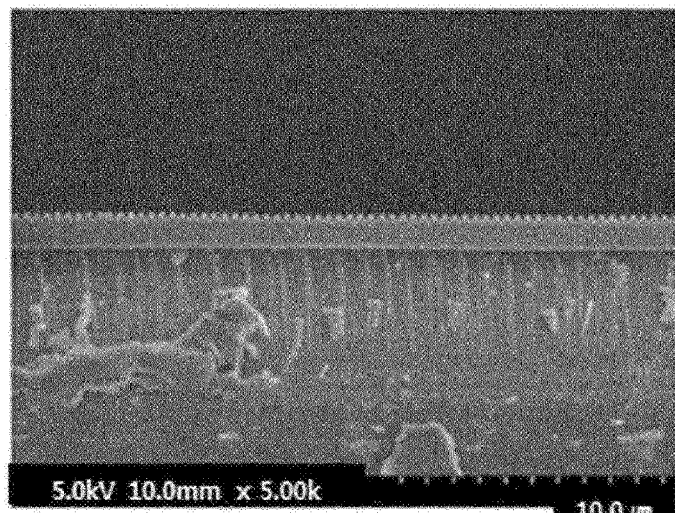
(B)
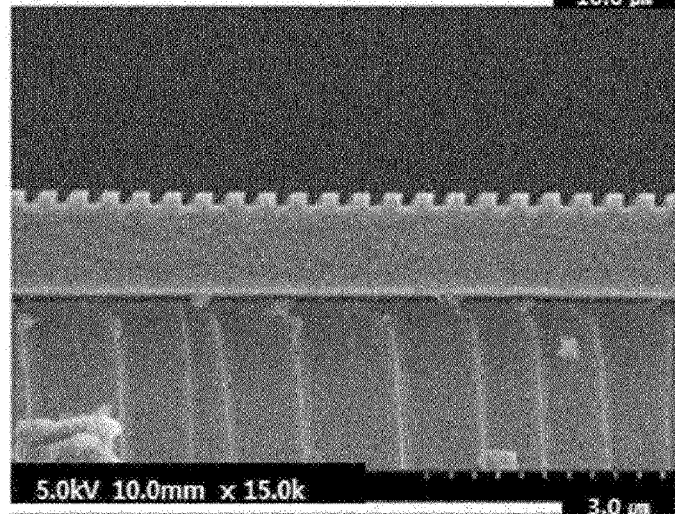
(C)
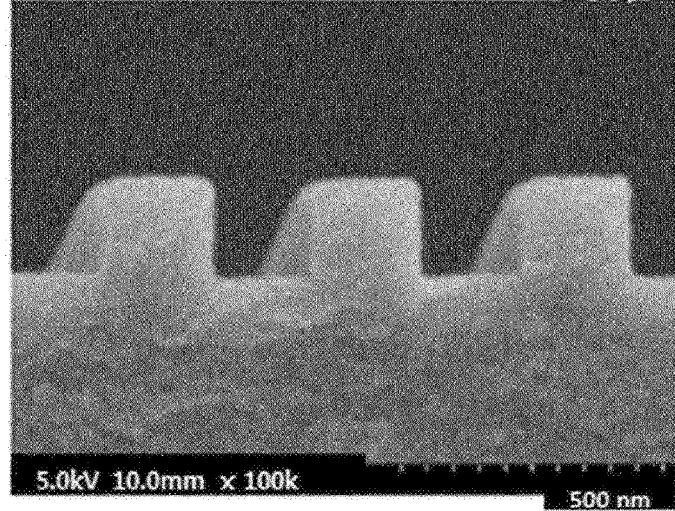

[Figure 11B]
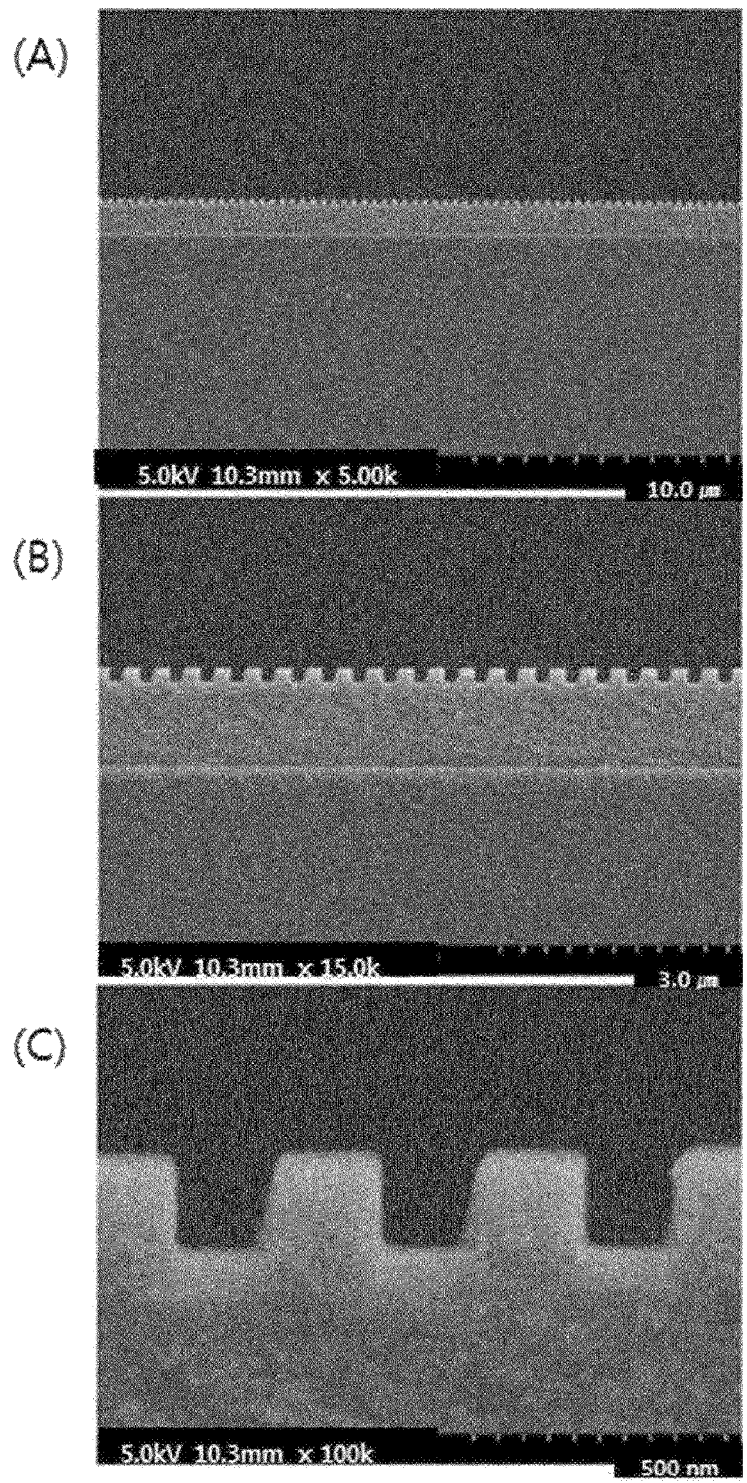

DIFFRACTION LIGHT GUIDE PLATE AND METHOD OF MANUFACTURING DIFFRACTION LIGHT GUIDE PLATE

CROSS-REFERENCE TO RELATED APPLICATIONS

This application is the U.S. national stage of International Application No. PCT/KR2018/010703 filed Sep. 12, 2018, and claims priority to and the benefit of Korean Patent Application No. 10-2017-0116701 filed in the Korean Intellectual Property Office on Sep. 12, 2017, the entire contents of which are incorporated herein by reference.

TECHNICAL FIELD

The present invention relates to a diffraction light guide plate and a method of manufacturing a diffraction light guide plate.

BACKGROUND ART

With recently growing interests in a display unit implementing Augmented Reality (AR), Mixed Reality (MR), or Virtual Reality (VR), researches on such display units have been actively pursued. The display unit implementing the AR, the MR, or the VR includes a diffraction light guide plate using a diffraction phenomenon based on a wave property of light. The diffraction light guide plate basically includes three substrates, in each of which a nano pattern, which is capable of diffracting light and has a grating form, is formed on one surface. However, there is a problem in that the diffraction light guide plate including the three substrates is thick, and is somewhat heavy for implementing the display unit implementing the AR, the MR, or the VR.

Further, in an existing scheme of manufacturing a diffraction light guide plate, the nano pattern having the grating form is formed on the substrate by using a roll to roll scheme. However, a process difficulty level of the roll to roll scheme is high, so that manufacturing efficiency of the diffraction light guide plate is not high. In addition, since the roll to roll scheme requires an additional process, such as a process of protecting the nano pattern, after the nano pattern having the grating form is formed on the substrate, there is a problem in that it is difficult to improve productivity of the diffraction light guide plate.

Accordingly, there is a need for a technology of effectively decreasing a thickness and weight of a diffraction light guide plate and a technology of easily manufacturing a diffraction light guide plate.

SUMMARY

The present specification aims to provide a diffraction light guide plate and a method of manufacturing a diffraction light guide plate.

An object to be solved in the present invention is not limited to the aforementioned objects, and other objects non-mentioned herein will be clearly understood by those skilled in the art from descriptions below.

An exemplary embodiment of the present invention provides a diffraction light guide plate, including: a first diffraction substrate; and second diffraction substrate provided on the first diffraction substrate, in which the first diffraction substrate includes a first diffraction grating layer on one surface and a second diffraction grating layer on the other surface, the second diffraction substrate includes a third diffraction grating layer on one surface, the first diffraction grating layer separates light having a wavelength of 550 nm or more and 700 nm or less, the second diffraction grating layer separates light having a wavelength of 400 nm or more and 550 nm or less, and the third diffraction grating layer separates light having a wavelength of 450 nm or more and 650 nm or less.

An exemplary embodiment of the present invention provides a method of manufacturing the diffraction light guide plate according to the exemplary embodiment of the present invention, the method including: preparing a first diffraction substrate including a first diffraction grating layer on one surface and a second diffraction grating layer on the other surface; preparing a second diffraction substrate including a third diffraction grating layer on one surface; and attaching the first diffraction substrate and the second diffraction substrate.

According to the exemplary embodiment of the present invention, the diffraction light guide plate includes the first diffraction substrate including the first diffraction grating layer on one surface and the second diffraction grating layer on the other surface, thereby a thickness and weight of the diffraction light guide plate effectively decrease.

According to the exemplary embodiment of the present invention, it is possible to easily manufacture the diffraction light guide plate, whose a thickness and weight decreases.

The effects of the present invention are not limited to the foregoing effects, and non-mentioned effects will be clearly understood to those skilled in the art based on the present specification and the accompanying drawings.

BRIEF DESCRIPTION OF DRAWINGS

FIGS. 1A to 1D are schematic illustrations of diffraction light guide plates according to exemplary embodiments of the present invention.

FIG. 2A is a schematic illustration of an in-coupling angle and an out-coupling angle of a first diffraction substrate provided with a first diffraction grating layer and a second diffraction grating layer according to the exemplary embodiment of the present invention.

FIG. 2B is a schematic illustration of an in-coupling angle and an out-coupling angle of a diffraction substrate provided with a first diffraction grating layer and a third diffraction grating layer.

FIG. 3 is a schematic illustration of a plane of the first diffraction grating layer according to the exemplary embodiment of the present invention.

FIG. 4 is a schematic illustration of a cross-section of the first diffraction substrate including the first diffraction grating layer according to the exemplary embodiment of the present invention.

FIG. 5 is a schematic illustration of the first diffraction grating layer including a diffraction pattern according to the exemplary embodiment of the present invention.

FIG. 6 is a schematic illustration of a cross-section of the diffraction pattern included in the first diffraction grating layer according to the exemplary embodiment of the present invention.

FIGS. 8A and 8B are schematic illustrations of a cross-section of a diffraction light guide plate including the first diffraction grating layer to the third diffraction grating layer according to the exemplary embodiment of the present invention.

FIG. 9 is a schematic illustration of the first diffraction grating layer including a first diffraction pattern to a third diffraction pattern according to the exemplary embodiment of the present invention.

FIG. 10 is a schematic illustration of a preparation of the first diffraction substrate by using two substrates according to the exemplary embodiment of the present invention.

FIG. 11A is a scanning electron microscope (SEM) image of a first diffraction grating layer according to Example 1.

FIG. 11B is an SEM image of a second diffraction grating layer according to Example 1.

DETAILED DESCRIPTION

Figure 7A:
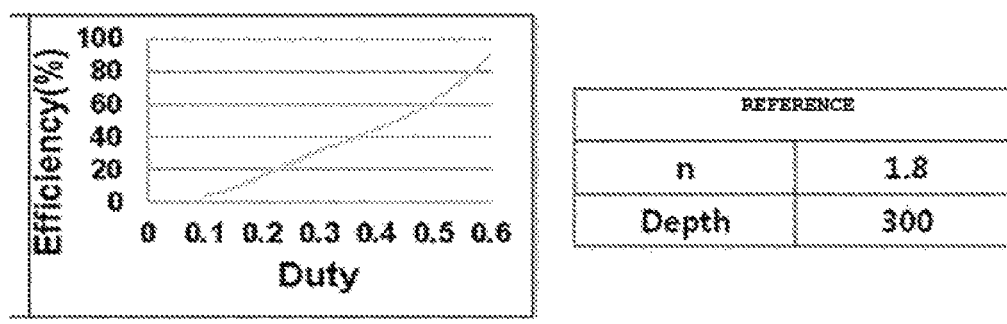
FIGS. 7A-7C are schematic illustrations of the results of light diffraction efficiency of the diffraction grating layer according to a duty, a depth, and a light refractive index of a pattern structure included in the diffraction grating layer according to the exemplary embodiment of the present invention.

In the present specification, unless explicitly described to the contrary, when it is said that a specific part "comprises/includes" a specific constituent element, this means that another constituent element may be further "included/comprised" not that another constituent element is excluded.

Throughout the specification of the present application, when an element is referred to as being "on" another element, this includes the case where the element is in contact with another element, and the case where another element is present between the two elements.

Throughout the present specification, when it is said that one portion is "connected" with another portion, it includes the case where one portion is "directly connected" with another portion, and the case where one portion is connected with another portion "with another element interposed therebetween".

Throughout the present specification, "A and/or B" means "A and B or A or B".

The present inventors found that it is possible to effectively decrease an entire thickness and weight of a manufactured diffraction light guide plate by forming a first diffraction grating layer on one surface of a first diffraction substrate and forming a second diffraction grating layer on the other surface of the first diffraction substrate. Further, the inventors found that a first diffraction substrate including a first diffraction grating layer, which is capable of separating first light having a wavelength value of 550 nm or more and 700 nm or less, on one surface and a second diffraction grating layer, which is capable of separating second light having a wavelength value of 400 nm or more and 550 nm or less, on the other surface may effectively prevent cross talk incurable between the first light and the second light to develop a diffraction light guide plate and a method of manufacturing the same.

Hereinafter, the present specification will be described in more detail.

An exemplary embodiment of the present invention provides a diffraction light guide plate, including: a first diffraction substrate; and a second diffraction substrate provided on the first diffraction substrate, in which the first diffraction substrate includes a first diffraction grating layer on one surface and a second diffraction grating layer on the other surface, the second diffraction substrate includes a third diffraction grating layer on one surface, the first diffraction grating layer separates light of a wavelength of 550 nm or more and 700 nm or less, the second diffraction grating layer separates light of a wavelength of 400 nm or more and 550 nm or less, and the third diffraction grating layer separates light of a wavelength of 450 nm or more and 650 nm or less.

According to the exemplary embodiment of the present invention, the diffraction light guide plate includes the first diffraction substrate including the first diffraction grating layer on one surface and the second diffraction grating layer on the other surface, thereby a thickness and weight of the diffraction light guide plate effectively decrease.

A display unit implementing Augmented Reality (AR), Mixed Reality (MR), or Virtual Reality (VR) includes a diffraction light guide plate using a diffraction phenomenon based on a wave property of light. A diffraction light guide plate in the related art basically includes three substrates, which diffract light, and a grating pattern is formed on one surface of each of the three substrates. However, there is a problem in that the diffraction light guide plate in the related art including the three substrates formed with the grating patterns on one surfaces is thick and heavy.

However, according to the exemplary embodiment of the present invention, the diffraction light guide plate includes the first diffraction substrate including the first diffraction grating layer on one surface and the second diffraction grating layer on the other surface, thereby a thickness and weight of the diffraction light guide plate effectively decrease. That is, the diffraction light guide plate includes two substrates including the first diffraction substrate and the second diffraction substrate, thereby a display unit including the diffraction light guide plate is effectively lightened. Further, a volume of a display unit including the diffraction light guide plate may effectively decrease.

According to the exemplary embodiment of the present invention, the first diffraction substrate may include the first diffraction grating layer on one surface and the second diffraction grating layer on the other surface, and the second diffraction substrate may include a third diffraction grating layer on one surface. That is, the first diffraction grating layer may be provided on one surface of the first diffraction substrate and the second diffraction grating layer may be provided on the other surface of the first diffraction substrate, and the third diffraction grating layer may be provided on the one surface of the second diffraction substrate.

According to the exemplary embodiment of the present invention, the first diffraction substrate including the first diffraction grating layer and the second diffraction grating layer and the second diffraction substrate including the third diffraction grating layer may guide light incident to the first diffraction substrate and the second diffraction substrate to one point through internal reflection or internal total reflection. Particularly, the light incident to the first diffraction substrate may be reflected or totally reflected inside the first diffraction substrate and be emitted to a different point from a point, at which the light is incident to the first diffraction substrate.

According to the exemplary embodiment of the present invention, a light refractive index of each of the first diffraction substrate and the second diffraction substrate may be 1.5 or more and less than 2.0. Particularly, each of the first diffraction substrate and the second diffraction substrate may have a light refractive index of 1.5 or more and less than 2.0 with respect to light having a wavelength of 400 nm or more and 700 nm or less. Further, the light refractive indexes of the first diffraction substrate and the second diffraction substrate may be the same as or different from each other.

According to the exemplary embodiment of the present invention, as long as the first diffraction substrate and the second diffraction substrate have the light refractive index within the range, a substrate generally used in the art may be included as the first diffraction substrate and the second diffraction substrate. Particularly, as the first diffraction substrate and the second diffraction substrate, glass including at least one of high refractive components, such as $TiO_2$, $Al_2O_3$, $Ga_2O_3$, $TeO_2$, $ZrO_2$, $Ta_2O_5$, $Nb_2O_5$, ZnS, a resin film including at least one of the high refractive components, and the like may be used, but the kind of first diffraction substrate and second diffraction substrate is not limited.

According to the exemplary embodiment of the present invention, one surface of the first diffraction substrate may face one surface or the other surface of the second diffraction substrate, or the other surface of the first diffraction substrate may face one surface or the other surface of the second diffraction substrate. Particularly, the second diffraction substrate may be provided on the first diffraction substrate so that the first diffraction grating layer included on one surface of the first diffraction substrate is adjacent to the third diffraction grating layer included on one surface of the second diffraction substrate. Further, the second diffraction substrate may be provided on the first diffraction substrate so that the first diffraction grating layer is adjacent to the other surface of the second diffraction substrate. Further, the second diffraction substrate may be provided on the first diffraction substrate so that the second diffraction grating layer is adjacent to the third diffraction grating layer, and the second diffraction substrate may be provided on the first diffraction substrate so that the second diffraction grating layer is adjacent to the other surface of the second diffraction substrate.

FIGS. 1A to 1D are diagrams schematically illustrating diffraction light guide plates according to exemplary embodiments of the present invention. Particularly, FIG. 1A is a diagram illustrating a diffraction light guide plate, in which a first diffraction substrate 100 provided with a first diffraction grating layer 310 on one surface and a second diffraction grating layer 320 on the other surface, and a second diffraction substrate 200 provided with a third diffraction grating layer 330 on one surface are connected by a spacer 400, and the other surface of the first diffraction substrate 100 faces the other surface of the second diffraction substrate 200. FIG. 1B is a diagram illustrating a diffraction light guide plate, in which a first diffraction substrate 100 is connected with a second diffraction substrate 200 by a spacer 400 in a state where one surface of the first diffraction substrate 100 provided with a first diffraction grating layer 310 faces the other surface of the second diffraction substrate 200, in which a third diffraction grating layer 330 is not provided. FIG. 1C is a diagram illustrating a diffraction light guide plate, in which a first diffraction substrate 100 is connected with a second diffraction substrate 200 by a spacer 400 in a state where the other surface of the first diffraction substrate 100 provided with a second diffraction grating layer 320 faces one surface of the second diffraction substrate 200 provided with a third diffraction grating layer 330. FIG. 1D is a diagram illustrating a diffraction light guide plate, in which a first diffraction substrate 100 is connected with a second diffraction substrate 200 by a spacer 400 in a state where one surface of the first diffraction substrate 100 provided with a first diffraction grating layer 310 faces the one surface of the second diffraction substrate 200, in which a third diffraction grating layer 330 is provided.

According to the exemplary embodiment of the present invention, the diffraction grating layer of the first diffraction substrate may be provided to be spaced apart from the second diffraction substrate. Particularly, the first diffraction substrate may be provided to be spaced apart from the second diffraction substrate so that the first diffraction grating layer or the second diffraction grating layer is spaced apart from the third diffraction grating layer or the other surface of the second diffraction substrate. As illustrated in FIG. 1A, the second diffraction grating layer 320 of the first diffraction substrate 100 may be provided to be spaced apart from the other surface of the second diffraction substrate 200. Further, as illustrated in FIG. 1B, the first diffraction grating layer 310 of the first diffraction substrate 100 may be provided to be spaced apart from the other surface of the second diffraction substrate 200. Further, as illustrated in FIG. 1C, the second diffraction grating layer 320 of the first diffraction substrate 100 may be provided to be spaced apart from the third diffraction grating layer 330 of the second diffraction substrate 200. Further, as illustrated in FIG. 1D, the first diffraction grating layer 310 of the first diffraction substrate 100 may be provided to be spaced apart from the third diffraction grating layer 330 of the second diffraction substrate 200.

According to the exemplary embodiment of the present invention, the first diffraction substrate and the second diffraction substrate may be attached in the spaced state through the spacer. Referring to FIGS. 1A to 1D, one end portion of the first diffraction substrate 100 and one end portion of the second diffraction substrate 200, and the other end portion of the first diffraction substrate 100 and the other end portion of the second diffraction substrate 200 may be connected by the spacer 400. As the spacer, a publicly known configuration, which is capable of connecting the first diffraction substrate and the second diffraction substrate, may be used, and a configuration having elasticity may also be used as the spacer.

According to the exemplary embodiment of the present invention, a thickness of each of the first diffraction substrate and the second diffraction substrate may be 0.1 mm or more and 2 mm or less. Referring to FIG. 1A, a thickness h1 of the first diffraction substrate 100 may be 0.5 mm or more and 1.8 mm or less, 0.8 mm or more and 1.6 mm or less, 1 mm or more and 1.4 mm or less, 0.7 mm or more and 1 mm or less, 1.1 mm or more and 1.8 mm or less, or 1.3 mm or more and 1.5 mm or less. The first diffraction grating layer is provided on one surface of the first diffraction substrate having the foregoing thickness and the second diffraction grating layer is provided on the other surface of the first diffraction substrate, so that a gap between the first diffraction grating layer and the second diffraction grating layer may be adjusted to the foregoing range. The gap between the first diffraction grating layer and the second diffraction grating layer is adjusted to the foregoing range, so that the first diffraction substrate may more effectively discriminate and separate the first light and the second light from the incident light. Further, it is possible to provide the first diffraction substrate having excellent efficiency of diffraction to light.

Further, a thickness of the second diffraction substrate may be 0.1 mm or more and 2 mm or less, and the thickness of the second diffraction substrate may be the same as or different from the thickness of the first diffraction substrate.

According to the exemplary embodiment of the present invention, the first diffraction grating layer may separate light of a wavelength of 550 nm or more and 700 nm or less, the second diffraction grating layer may separate light of a wavelength of 400 nm or more and 550 nm or less, and the third diffraction grating layer may separate light of a wavelength of 450 nm or more and 650 nm or less. Particularly, the first diffraction grating layer may separate the first light having a wavelength value of 550 nm or more and 700 nm or less from the light incident to the first diffraction grating layer. Further, the second diffraction grating layer may separate the second light having a wavelength value of 400 nm or more and 550 nm or less from the light incident to the second diffraction grating layer. Further, the third diffraction grating layer may separate third light having a wavelength value of 450 nm or more and 650 nm or less from the light incident to the third diffraction grating layer.

The wavelength values of the light separated in the first diffraction grating layer, the second diffraction grating layer, and the third diffraction grating layer may be measured by using equipment of measuring a wavelength value of light in the art. For example, the wavelength value of the light may be measured by using an optical wavelength meter (86120C, Agilent Technologies Company).

According to the exemplary embodiment of the present invention, when first incident light including light having various wavelength values is emitted to the first diffraction grating layer 310 included on one surface of the first diffraction substrate 100 for the diffraction light guide plate including the first diffraction substrate 100 and the second diffraction substrate 200 as illustrated in FIG. 1A, the first diffraction grating layer 310 may separate the first light having the wavelength value of 550 nm or more and 700 nm or less from the first incident light. Then, when second incident light, in which the first light is separated from the first incident light, is emitted to the second diffraction grating layer 320 while being reflected or totally reflected from the internal side of the first diffraction substrate 100, the second diffraction grating layer 320 may separate the second light having the wavelength value of 400 nm or more and 550 nm or less from the second incident light. Then, when third incident light, in which the second light is separated from the second incident light, is emitted to the third diffraction grating layer 330, the third diffraction grating layer 330 may separate the third light having the wavelength value of 450 nm or more and 650 nm or less from the third incident light.

Further, when first incident light is emitted to the second diffraction grating layer 320 for the diffraction light guide plate including the first diffraction substrate 100 and the second diffraction substrate 200 as illustrated in FIG. 1B, the second diffraction grating layer 320 may separate the second light from the first incident light. Then, when second incident light, in which the second light is separated from the first incident light, is emitted to the first diffraction grating layer 310, the first diffraction grating layer 310 may separate the first light from the second incident light. Then, when third incident light, in which the first light is separated from the second incident light, is emitted to the third diffraction grating layer 330, the third diffraction grating layer 330 may separate the third light from the third incident light.

Further, the diffraction light guide plates of FIGS. 1C and 1D may separate the first light, the second light, and the third light from the first incident light by the same scheme as that of the diffraction light guide plates of FIGS. 1A and 1B.

According to the exemplary embodiment of the present invention, the first diffraction substrate including the first diffraction grating layer on one surface and the second diffraction grating layer on the other surface may more effectively discriminate and separate the first light and the second light from the light incident to the first diffraction substrate. Particularly, the first diffraction substrate includes the first diffraction grating layer on one surface and the second diffraction grating layer on the other surface, and the first diffraction grating layer separates the first light having the wavelength value of 550 nm or more and 700 nm or less and the second diffraction grating layer separates the second light having the wavelength value of 400 nm or more and 550 nm or less, thereby preventing a cross talk phenomenon from being generated between the first light and the second light. That is, the generation of the cross talk phenomenon between the first light separated in the first diffraction grating layer provided in the single first diffraction substrate and the second light separated in the second diffraction grating layer is prevented, so that it is possible to decrease a thickness and weight of the diffraction light guide plate and simultaneously improve light separation efficiency of the first diffraction substrate. Further, it is possible to improve light diffraction efficiency of the first diffraction substrate and effectively suppress a double image phenomenon and a chromatic dispersion phenomenon.

FIG. 2A is a diagram illustrating an in-coupling angle and an out-coupling angle of the first diffraction substrate provided with the first diffraction grating layer and the second diffraction grating layer according to the exemplary embodiment of the present invention, and FIG. 2B is a diagram illustrating an in-coupling angle and an out-coupling angle of a diffraction substrate provided with a first diffraction grating layer and a third diffraction grating layer. Particularly, FIG. 2A is a diagram illustrating an in-coupling angle and an out-coupling angle of the first diffraction substrate provided with the first diffraction grating layer and the second diffraction grating layer according to the exemplary embodiment of the present invention and is a drawing illustrating a reflection form of light incident to the first diffraction substrate within the substrate. Further, FIG. 2B is a diagram illustrating an in-coupling angle and an out-coupling angle of a diffraction substrate provided with a first diffraction grating layer and a third diffraction grating layer unlike the exemplary embodiment of the present invention, and is a drawing illustrating a reflection form of light incident to the diffraction substrate within the substrate.

Referring to FIG. 2A, in the case of the first diffraction substrate including the first diffraction grating layer, which separates light of a wavelength of 550 nm or more and 700 nm or less, and the second diffraction grating layer, which separates light of a wavelength of 400 nm or more and 550 nm or less, according to the exemplary embodiment of the present invention, it is confirmed that the cross talk phenomenon is not generated in the first diffraction substrate, so that a double image is not generated in a field of view and the diffraction of light is generated as set in the first diffraction substrate. In the meantime, referring to FIG. 2B, in the case of the diffraction substrate including the first diffraction grating layer, which separates light of a wavelength of 550 nm or more and 700 nm or less, and the third diffraction grating layer, which separates light of a wavelength of 450 nm or more and 650 nm or less, it is confirmed that the cross talk phenomenon is generated in the diffraction substrate, a double image and a chromatic dispersion phenomenon are generated in a field of view by the cross talk phenomenon, and the diffraction of light different from the set diffraction is generated within the diffraction substrate.

In this case, the in-coupling angles and the out-coupling angles of the diffraction substrates of FIGS. 2A and 2B may be measured by using a device and/or a method of simulating an in-coupling angle and an out-coupling angle of a diffraction substrate used in the art.

In the present invention, an in-coupling angle and an out-coupling angle of a diffraction substrate may be simulated by using Equation 1 below.

$$\sin(\theta_{in})-\sin(\theta_{out})=\lambda(1/b-1/a) \qquad \text{[Equation 1]}$$

In Equation 1, $\theta_{in}$ means an in-coupling angle, and $\lambda$ is means an out-coupling angle. Further, in Equation 1, $\lambda$ is a wavelength, a is a cycle of a diffraction grating diffracting incident light into the diffraction substrate, and b is a cycle of a diffraction grating diffracting the light inside the diffraction substrate at an angle of emitted light. When in-coupling and out-coupling are generated on the same surface, that is, a=b, angles of incident light and emitted light are identically represented to white circles positioned in the field of view in FIGS. 2A and 2B. In the meantime, when in-coupling and out-coupling are generated in different surfaces, that is, a≠b, an in-coupling angle and an out-coupling angle are different, and an in-coupling angle and an out-coupling angle are also different according to a wavelength, so that chromatic dispersion is generated. FIG. 2A is a result obtained by calculating an out-coupling angle according to an in-coupling angle when a is 468 nm and b is 405 nm or a is 405 nm and b is 468 nm, and is expressed with a color corresponding to each wavelength. FIG. 2B is a result obtained by calculating an out-coupling angle according to an in-coupling angle when a is 468 nm and b is 340 nm or a is 304 nm and b is 468 nm, and is expressed with a color corresponding to each wavelength.

According to the exemplary embodiment of the present invention, a light refractive index of each of the first diffractive grating layer to the third diffractive grating layer may be 1.5 or more and less than 2. Each of the first diffraction grating layer to the third diffraction grating layer may have a light refractive index of 1.5 or more and less than 2.0 with respect to light having a wavelength of 400 nm or more and 700 nm or less.

Particularly, a light refractive index of each of the first diffraction grating layer to the third diffraction grating layer may be 1.55 or more and 1.9 or less, 1.6 or more and 1.8 or less, 1.7 or more and 1.8 or less, 1.5 or more and 1.8 or less, or 1.55 or more and 1.75 or less.

Each of the first diffraction grating layer, the second diffraction grating layer, and the third diffraction grating layer having the light refractive indexes of the range may have excellent diffraction performance for the incident light. When the light refractive index of each of the first diffraction grating layer to the third diffraction grating layer is within the range, it is possible to effectively suppress problems in that secondary diffraction is generated and light diffraction efficiency of the diffraction light guide plate decreases.

Further, the light refractive indexes of the first diffraction grating layer, the second diffraction grating layer, and the third diffraction grating layer may be the same as or different from one another.

According to the exemplary embodiment of the present invention, the light refractive index of the diffraction grating layer, the light refractive index of the diffraction substrate, and the like may be measured by using a method of measuring a light refractive index generally used in the art. For example, a light refractive index may be measured by using a prism coupler (SPA-4000) or ellipsometer.

According to the exemplary embodiment of the present invention, each of the first diffraction grating layer, the second diffraction grating layer, and the third diffraction grating layer may include at least one of the high refractive components, such as $TiO_2$, $Al_2O_3$, $Ga_2O_3$, $TeO_2$, $ZrO_2$, $Ta_2O_5$, $Nb_2O_5$, ZnS, HfO, MoO, CuO. However, the high refractive component included in the first diffraction grating layer, the second diffraction grating layer, and the third diffraction grating layer is not limited. The light refractive index of the diffraction grating layer may be controlled by adjusting a content, the kind, and the like of the high refractive component included in the diffraction grating layer.

According to the exemplary embodiment of the present invention, each of the first diffraction grating layer, the second diffraction grating layer, and the third diffraction grating layer may include a thermosetting resin or a photo-curable resin containing the high refractive component. Particularly, a thermosetting resin or a photo-curable resin may include an acrylic resin, such as urethane acrylate and epoxy acrylate, a polyamide resin, a polyimide resin, a silicon resin, an epoxy resin, a polyester resin, and the like, but the kind thereof is not limited.

According to the exemplary embodiment of the present invention, the light refractive indexes of the first diffraction grating layer and the second diffraction grating layer may be the same as or different from the light refractive index of the first diffraction substrate. Further, the light refractive index of the third diffraction grating layer may be the same as or different from the light refractive index of the second diffraction substrate.

According to the exemplary embodiment of the present invention, each of the first diffraction grating layer to the third diffraction grating layer may include a first area, into which light is incident, a second area, in which the incident light is expanded and moves, and a third area, from which the moved light is extracted, and the first area may be included in a corresponding position of each of the first diffraction grating layer to the third diffraction grating layer and the third area may be included in a corresponding position of each of the first diffraction grating layer to the third diffraction grating layer.

FIG. 3 is a diagram schematically illustrating a plane of the first diffraction grating layer according to the exemplary embodiment of the present invention. Particularly, FIG. 3 is a diagram illustrating a plane of the first diffraction grating layer 310 including a first area 511, into which light is incident, a second area 512, in which the incident light is expanded and moves, and a third area 513, from which the moved light is extracted. As illustrated in FIG. 3, the first area 511 to the third area 513 may be sequentially provided in a direction from one side A to the other side B of the first diffraction grating layer 310. In this case, in FIG. 3, the illustration of a pattern structure of the first diffraction grating layer is omitted.

Referring to FIG. 3, the first area 511 may be the area, into which incident light including light having various wavelength values is incident. Further, the second area 512 may be the area, in which the light incident to the first diffraction grating layer 310 is diffracted, and may be the area, which expands the light incident to the first area 511 to the third area 513. The third area 513 may be the area, from which the light is extracted, and when the diffraction light guide plate is used in a display unit, the third area 513 is a region adjacent to the eyeballs of a user of the display unit, and may be the area, from which light is extracted to provide display information to the user. In addition, similar to the first diffraction grating layer illustrated in FIG. 3, the second diffraction grating layer and the third diffraction grating layer may also include the first area to the third area.

FIG. 4 is a diagram schematically illustrating a cross-section of the first diffraction substrate including the first diffraction grating layer according to the exemplary embodiment of the present invention. Particularly, FIG. 4 is a diagram illustrating the case where light is incident to the first area 511 and then is extracted from the third area 513 to provide a user with display information. In FIG. 4, the illustration of the second diffraction substrate and the second diffraction grating layer included on the other surface of the first diffraction substrate is omitted. Further, as illustrated in FIG. 4, the second diffraction grating layer and the third diffraction grating layer may also extract the light incident to the first area through the third area.

According to the exemplary embodiment of the present invention, each of the first diffraction grating layer to the third diffraction grating layer may include a diffraction pattern. The diffraction pattern may include two or more pattern structures.

FIG. 5 is a diagram schematically illustrating the first diffraction grating layer including a diffraction pattern according to the exemplary embodiment of the present invention. Particularly, FIG. 5 is a diagram illustrating a diffraction pattern including two or more pattern structures provided in a direction from one side A to the other side B of the first diffraction grating layer 310. In FIG. 5, the illustration of the second diffraction grating layer included on the other surface of the first diffraction substrate is omitted. Identically to the illustration of FIG. 5, each of the second diffraction grating layer and the third diffraction grating layer may include a diffraction pattern including two or more pattern structures provided in the direction from one side to the other side of the diffraction grating layer.

According to the exemplary embodiment of the present invention, according to the form of the diffraction pattern included in each of the first diffraction grating layer to the third diffraction grating layer, wavelength values of the light separated from the light incident to the first diffraction grating layer, the second diffraction grating layer, and the third diffraction grating layer may be different.

FIG. 6 is a diagram schematically illustrating a cross-section of the diffraction pattern included in the first diffraction grating layer according to the exemplary embodiment of the present invention. Particularly, FIG. 6 is a diagram illustrating a diffraction pattern including two or more pattern structures. In FIG. 6, the second diffraction grating layer included on the other surface of the first diffraction substrate is omitted. Referring to FIG. 6, the pattern structure is provided from one surface of the first diffraction substrate 100 to have an angle θ1 of inclination, the pattern structure may have a depth of h2 and the two or more pattern structures may be provided to have a pitch of d1. In the present invention, the "pitch" means an interval, by which the pattern structure is repeated, and may mean a length between one point of one pattern structure and one point of another pattern structure adjacent to the one pattern structure as illustrated in FIG. 6. One point of one pattern structure and one point of another pattern structure may mean positions corresponding between the pattern structures.

Referring to FIG. 6, the pattern structure included in the diffraction pattern of the first diffraction grating layer 310 according to the exemplary embodiment of the present invention may be provided from one surface of the first diffraction substrate 100 to have an angle θ1 of inclination of 50° or more and less than 90°. Further, the two or more pattern structures may be provided to have a pitch d1 of 100 nm or more and 600 nm or less, and a depth h2 of the pattern structure may be larger than 0 nm and 600 nm or less. Particularly, the pattern structure included in the first diffraction grating layer may be 55° or more and 80° or less, 60° or more and 75° or less, 65° or more and 85° or less, 50° or more and 65° or less, or 70° or more and 80° or less. Further, the two or more pattern structures may be provided to have a pitch of 150 nm or more and 500 nm or less, 200 nm or more and 400 nm or less, 250 nm or more and 350 nm or less, 150 nm or more and 250 nm or less, 350 nm or more and 450 nm or less, or 500 nm or more and 600 nm or less. Further, the depth of the pattern structure may be 10 nm or more and 500 nm or less, 50 nm or more and 400 nm or less, 100 nm or more and 350 nm or less, 150 nm or more and 250 nm or less, 450 nm or more and 550 nm or less, or 300 nm or more and 400 nm or less.

According to the exemplary embodiment of the present invention, similar to the first diffraction grating layer, each of the second diffraction grating layer and the third diffraction grating layer may include two or more pattern structures, and the pattern structure may be provided with an angle of inclination of 50° or more and less than 90° from one surface of the diffraction substrate. Further, the two or more pattern structures may be provided to have a pitch of 100 nm or more and 600 nm or less, and a depth of the pattern structure may be more than 0 nm and 600 nm or less. Particularly, the angle of inclination of the pattern structure included in each of the second diffraction grating layer and the third diffraction grating layer may be 50° or more and 80° or less, 55° or more and 70° or less, 65° or more and 75° or less, or 70° or more and 80° or less. Further, the two or more pattern structures may be provided to have a pitch of 125 nm or more and 450 nm or less, 250 nm or more and 350 nm or less, 200 nm or more and 400 nm or less, 150 nm or more and 300 nm or less, 350 nm or more and 400 nm or less, or 500 nm or more and 655 nm or less. Further, the depth of the pattern structure may be 30 nm or more and 500 nm or less, 100 nm or more and 400 nm or less, 150 nm or more and 300 nm or less, 200 nm or more and 250 nm or less, 450 nm or more and 550 nm or less, or 300 nm or more and 400 nm or less.

According to the exemplary embodiment of the present invention, the forms of the diffraction patterns included in the first diffraction grating layer, the second diffraction grating layer, and the third diffraction grating layer may be different. For example, the pitch of the pattern structure included in the diffraction pattern of the first diffraction grating layer is the same as the pitch of the pattern structure included in the diffraction pattern of the second diffraction grating layer, but the angle of inclination and the depth of the pattern structure included in the diffraction pattern of the first diffraction grating layer may be different from the angle of inclination and the depth of the pattern structure included in the diffraction pattern of the second diffraction grating layer. Further, the depth of the pattern structure included in the diffraction pattern of the second diffraction grating layer is the same as the depth of the pattern structure included in the diffraction pattern of the third diffraction grating layer, but the angle of inclination of the grating of the pattern structure included in the diffraction pattern of the second diffraction grating layer may be different from the angle of inclination of the grating of the pattern structure included in the diffraction pattern of the third diffraction grating layer.

Accordingly, according to the exemplary embodiment of the present invention, it is possible to easily control the wavelength value of light separated from the light incident to the diffraction grating layer, the light refractive index of the diffraction grating layer, and light diffraction efficiency by adjusting the angle of inclination of the pattern structure included in the diffraction pattern of the diffraction grating layer with respect to the diffraction substrate, the pitch between the pattern structures, and the depth of the pattern structure.

FIG. 7 is a diagram illustrating simulation results of light diffraction efficiency of the diffraction grating layer according to a duty, a depth, and a light refractive index of a pattern structure included in the diffraction grating layer according to the exemplary embodiment of the present invention.

Figure 7B:
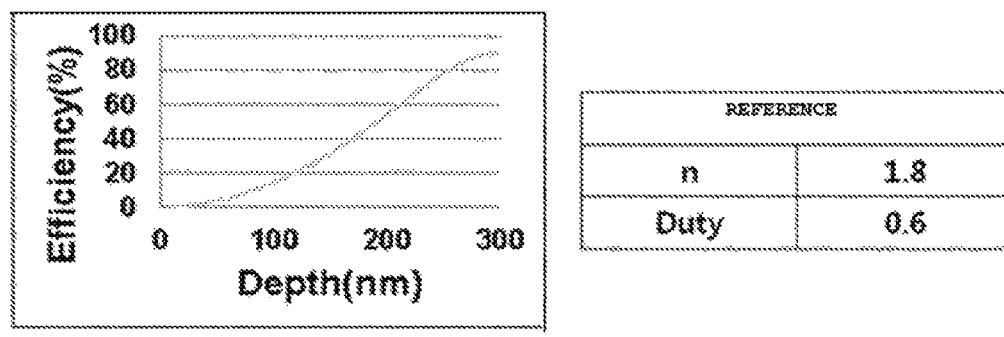

Particularly, FIG. 7A represents a simulation result of light diffraction efficiency of the diffraction grating layer according to a duty of the pattern structure, in which a light refractive index n of the diffraction grating layer is set to 1.8 and a depth of the diffraction grating layer is set to 300 nm. In addition, FIG. 7B represents a simulation result of light diffraction efficiency of the diffraction grating layer according to a depth of the pattern structure, in which a light refractive index n of the diffraction grating layer is set to 1.8 and a duty of the diffraction grating layer is set to 0.6. In addition, FIG. 7C represents a simulation result of light diffraction efficiency of the diffraction grating layer according to a light refractive index of the pattern structure, in which a duty of the diffraction grating layer is set to 0.6 and a depth of the diffraction grating layer is set to 300 nm.

Figure 7C:
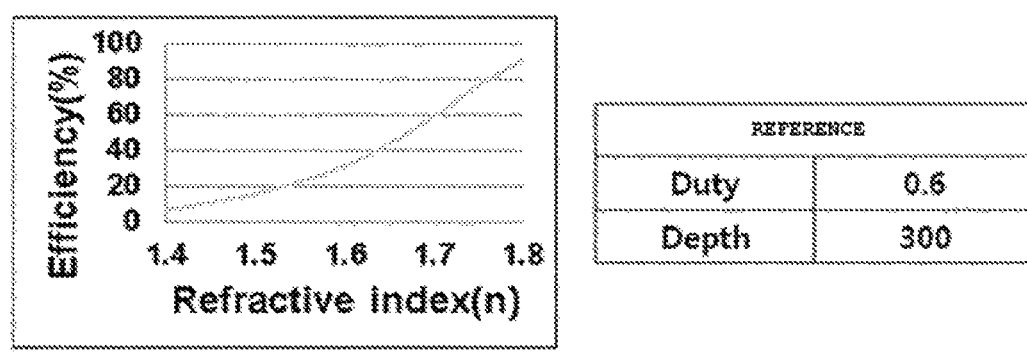

Referring to FIGS. 7A to 7C, it can be seen that it is possible to easily control light diffraction efficiency of the diffraction grating layer by adjusting the duty and the depth of the pattern structure included in the diffraction grating layer according to the exemplary embodiment of the present invention, and the light refractive index of the diffraction grating layer.

In this case, the simulations in FIGS. 7A to 7C may be calculated by using a device and/or a method of calculating light diffraction efficiency of a diffraction substrate used in the art, and may be calculated by using VirtualLab SoftWare using the rigorous coupled wave analysis algorithm in the present invention.

FIGS. 8A and 8B are diagrams schematically illustrating a cross-section of a diffraction light guide plate including the first diffraction grating layer to the third diffraction grating layer according to the exemplary embodiment of the present invention. Particularly, FIG. 8A illustrates first diffraction patterns 311, 321, and 331 included in the first areas 511, 521, and 531 of the first diffraction grating layer 310, the second diffraction grating layer 320, and the third diffraction grating layer 330, respectively, second diffraction patterns 312, 322, and 332 included in the second areas 512, 522, and 532 of the first diffraction grating layer 310, the second diffraction grating layer 320, and the third diffraction grating layer 330, respectively, and third diffraction patterns 313, 323, and 333 included in the third areas 513, 523, and 533 of the first diffraction grating layer 310, the second diffraction grating layer 320, and the third diffraction grating layer 330, respectively. Further, FIG. 8B illustrates first diffraction patterns 311 and 321 included in the first areas 511 and 521 of the first diffraction grating layer 310 and the second diffraction grating layer 320, respectively, second diffraction patterns 312 and 322 included in the second areas 512 and 522 of the first diffraction grating layer 310 and the second diffraction grating layer 320, respectively, and third diffraction patterns 313 and 323 included in the third areas 513 and 523 of the first diffraction grating layer 310 and the second diffraction grating layer 320, respectively, and illustrates the diffraction light guide plate including the first diffraction pattern 331 included in the first area 531 of the third diffraction grating layer 330, the third diffraction patterns 333 included in the third area 533, and the second diffraction grating patterns 332 and 332' included in the two second areas 532 and 532', respectively.

According to the exemplary embodiment of the present invention, the first area may be included in a corresponding position of each of the first diffraction grating layer to the third diffraction grating layer, and the third area may be included in a corresponding position of each of the first diffraction grating layer to the third diffraction grating layer. That is, the first area included in each of the first diffraction grating layer to the third diffraction grating layer may be aligned to be provided at the corresponding position of each of the first diffraction grating layer to the third diffraction grating layer. Further, the third area included in each of the first diffraction grating layer to the third diffraction grating layer may be aligned to be provided at the corresponding position of each of the first diffraction grating layer to the third diffraction grating layer.

According to the exemplary embodiment of the present invention, the position, at which the first area of the first diffraction grating layer is provided, the position, at which the first area of the second diffraction grating layer is provided, and the position, at which the first area of the third diffraction grating layer is provided may correspond to one another. Particularly, the positions of the first diffraction grating layer to the third diffraction grating layer including the first area may be the same, and the positions of the first diffraction grating layer to the third diffraction grating layer including the third area may be the same.

According to the exemplary embodiment of the present invention, the position, at which the first area of the first diffraction grating layer is provided, may correspond to the position, at which the first area of the second diffraction grating layer is provided, the position, at which the first area of the second diffraction grating layer is provided, may correspond to the position, at which the first area of the third diffraction grating layer is provided, and the position, at which the first area of the first diffraction grating layer is provided, may correspond to the position, at which the first area of the third diffraction grating layer is provided. Further, the position, at which the third area of the first diffraction grating layer is provided, the position, at which the third area of the second diffraction grating layer is provided, and the position, at which the third area of the third diffraction grating layer is provided may correspond to one another. That is, the position, at which the third area of the first diffraction grating layer is provided, may correspond to the position, at which the third area of the second diffraction grating layer is provided, the position, at which the third area of the second diffraction grating layer is provided, may correspond to the position, at which the third area of the third diffraction grating layer is provided, and the position, at which the third area of the first diffraction grating layer is provided, may correspond to the position, at which the third area of the third diffraction grating layer is provided.

Further, an area between the first areas and an area between the third areas, which are aligned so as to correspond to the first diffraction grating layer to the third diffraction grating layer, respectively, may be substantially the same. In the present invention, "the areas are substantially the same" may mean the case where the areas including a minor error generable during the manufacturing are the same, as well as the case where the areas are accurately the same.

Referring to FIGS. 8A and 8B, the positions including the first areas 511, 521, and 531 included in the first diffraction grating layer 310, the second diffraction grating layer 320, and the third diffraction grating layer 330, respectively, may correspond to one another. Further, the positions including the third areas 513, 523, and 533 included in the first diffraction grating layer 310, the second diffraction grating layer 320, and the third diffraction grating layer 330, respectively, may correspond to one another. That is, the first area and the third area included in each of the first diffraction grating layer to the third diffraction grating layer may be provided to positions corresponding to each of the first diffraction grating layer to the third diffraction grating layer.

Further, the first area included in each of the first diffraction grating layer to the third diffraction grating layer may substantially have the same area, and the third area included in each of the first diffraction grating layer to the third diffraction grating layer may substantially have the same area. The first area and the third area included in each of the first diffraction grating layer, the second diffraction grating layer, and the third diffraction grating layer are formed at the corresponding positions, so that it is possible to improve a quality, such as definition, of an image implemented by a display unit, to which the diffraction light guide plate is applied.

In the meantime, according to the exemplary embodiment of the present invention, the second areas included in the first diffraction grating layer, the second diffraction grating layer, and the third diffraction grating layer may be provided at the corresponding positions or may be provided at different positions. Referring to FIG. 6A, the second areas 512, 522, and 532 included in the first diffraction grating layer 310, the second diffraction grating layer 320, and the third diffraction grating layer 330 may be provided at the corresponding positions. Further, referring to FIG. 8B, the formed position and the area of the second area 512 provided in the first diffraction grating layer 310 may be different from the formed positions and the areas of the second areas 532 and 532' included in the third diffraction grating layer 330.

According to the exemplary embodiment of the present invention, the first diffraction grating layer to the third diffraction grating layer may include the first area and the third area, and may selectively include the second area. For example, the first diffraction grating layer to the third diffraction grating layer may include the first area to the third area, and the second diffraction grating layer may include only the first area and the third area.

According to the exemplary embodiment of the present invention, the number of first areas, second areas, and third areas included in each of the first diffraction grating layer, the second diffraction grating layer, and the third diffraction grating layer may be plural. For example, the third diffraction grating layer may include one first area, two second areas, and one third area. Referring to FIG. 8B, the third diffraction grating layer 330 may include two second areas 532 and 532', and each of the two second areas 532 and 532' may include the second diffraction patterns 332 and 332'.

According to the exemplary embodiment of the present invention, the first diffraction pattern, the second diffraction pattern, and the third diffraction pattern included in the first diffraction grating layer to the third diffraction grating layer, respectively, may have different forms. For example, an inclination direction, an angle of inclination, a depth, a width, and the like of the pattern structure included in the first diffraction pattern of the first diffraction grating layer may be different from those of the pattern structure included in the second diffraction pattern of the first diffraction grating layer. Further, an inclination direction, an angle of inclination, a depth, a width, and the like of the pattern structure included in the first diffraction pattern of the first diffraction grating layer may be different from those of the pattern structure included in the first diffraction pattern of the second diffraction grating layer.

FIG. 9 is a diagram schematically illustrating the first diffraction grating layer including the first diffraction pattern to the third diffraction pattern according to the exemplary embodiment of the present invention. Particularly, FIG. 9 is a diagram illustrating the first diffraction grating layer 310, in which inclination directions, angles of inclination, pitches, and depths of the pattern structure included in the first diffraction pattern 311, the pattern structure included in the second diffraction pattern 312, and the pattern structure included in the third diffraction pattern 313 are different. In FIG. 9, the illustration of the second diffraction grating layer included on the other surface of the first diffraction substrate is omitted.

Referring to FIG. 9, it is possible to improve efficiency of the separation of the first light from the light incident to the first diffraction grating layer and diffraction efficiency of light with respect to the first diffraction substrate by adjusting the inclination directions and the angles of inclination of the pattern structures included in the first diffraction pattern 311, the second diffraction pattern 312, and the third diffraction pattern 313 of the first diffraction grating layer 310 with respect to the diffraction substrate, the pitches of the pattern structures, and the depth of the pattern structures. Further, similar to the first diffraction grating layer, the inclination directions and the angles of inclination of the pattern structures included in the first diffraction patterns, the second diffraction patterns, and the third diffraction patterns of the second diffraction grating layer and the third diffraction grating layer, the pitches of the pattern structures, and the depth of the pattern structures may be adjusted.

Accordingly, according to the exemplary embodiment of the present invention, it is possible to provide a diffraction light guide plate, with which a display capable of implementing a clear image is manufactured, by adjusting the angle of inclination, the pitch, the depth, and the like of the pattern structure included in the diffraction pattern of the diffraction grating layer.

According to the exemplary embodiment of the present invention, a light refractive index of the third area included in each of the first diffraction grating layer to the third diffraction grating layer may gradually increase from one side to the other side.

In the case of the diffraction light guide plate in the related art, light diffraction efficiency is the same throughout the entire areas, from which light is extracted to provide display information to a user. When the light diffraction efficiency is the same in the entire portions of the area included in the diffraction light guide plate, in which light is diffracted, the amount of light diffracted by the diffraction light guide plate is decreased in the process of reflecting or totally reflecting light inside the diffraction light guide plate. Particularly, when light is incident to one side surface of the diffraction light guide plate and is guided to the other side surface of the diffraction light guide plate, the amount of light diffracted in the diffraction area decreases from one side surface to the other side surface of the diffraction light guide plate. When the amount of light diffracted is different according to a portion of the diffraction light guide plate, light having high luminosity is emitted in the portion, in which the amount of light diffracted is large, but light having low luminosity is emitted in the portion, in which the amount of light diffracted is small. Accordingly, in the case of the diffraction light guide plate in the related art, the light diffraction efficiency is the same throughout the entire areas, from which light is extracted, so that there may be a problem in that luminosity of the extracted light is not uniform according to the portion of the area, from which light is extracted.

In the meantime, according to the exemplary embodiment of the present invention, the light refractive index of the third area of each of the first diffraction grating layer to the third diffraction grating layer may gradually increase from one side to the other side. The third area may be the area, from which light is extracted, and the light refractive index of the third area gradually increases from one side to the other side, so that luminosity of the extracted light may be uniform according to the portion of the third area. Accordingly, according to the exemplary embodiment of the present invention, it is possible to implement a diffraction light guide plate, which is capable of providing display information having the same luminosity to a user.

Further, similar to the third area, the light refractive index of the first area and/or the second area included in each of the first diffraction grating layer to the third diffraction grating layer may gradually increase from one side to the other side.

According to the exemplary embodiment of the present invention, the third area may include a diffraction pattern including an inclined pattern structure, whose depth gradually increases from one side to the other side. Particularly, the third area includes the diffraction pattern including the inclined pattern structure, whose depth gradually increases from one side to the other side, so that it is possible to gradually increase the light refractive index from one side to the other side of the third area. Referring to FIG. 9, the diffraction pattern including the inclined pattern structure, whose depth gradually increases in a direction from one side A to the other side B of the third area 513, is included in the third area, so that the light refractive index may gradually increases from the direction from one side to the other side of the third area. The light refractive index gradually increases from one side to the other side of the third area, so that light diffraction efficiency may gradually increases from one side to the other side of the third area.

Accordingly, according to the exemplary embodiment of the present invention, the decrease in the amount of light is prevented during the process, in which light is diffracted from the direction from one side to the other side of the third area by gradually increasing the depth of the inclined pattern structure included in the third area of each of the first diffraction grating layer to the third diffraction grating layer in the direction from one side to the other side, so that luminosity of the light emitted from each portion of the third area may be uniform.

Further, similar to the third area, the first area and/or the second area included in each of the first diffraction grating layer to the third diffraction grating layer may include the diffraction pattern including the inclined pattern structure, whose depth gradually increases from one side to the other side.

According to the exemplary embodiment of the present invention, the third area may include the pattern structure, whose duty gradually increases from one side to the other side. In the present invention, the "duty" may mean a value (a width of the pattern structure/a pitch of the pattern structure) obtained by dividing a value of a width of the pattern structure by a pitch of the pattern structure. Referring to FIG. 6, the duty of the pattern structure may be a value (d2/d1) obtained by dividing a width d2 of the pattern structure by a pitch d1 of the pattern structure.

According to the exemplary embodiment of the present invention, the third area includes the pattern structure, whose duty gradually increases from one side to the other side, so that it is possible to gradually increase the light refractive index from one side to the other side of the third area. The duty of the pattern structure gradually increases from one side to the other side of the third area, so that the light refractive index may gradually increases in a direction from one side to the other side of the third area. The light refractive index gradually increases from one side to the other side of the third area, so that light diffraction efficiency may gradually increases from one side to the other side of the third area. For example, the duty of the pattern structure may gradually increases in the direction from one side to the other side of the third area by setting the pitches of the pattern structures to be the same and gradually increasing the width of the pattern structure.

According to the exemplary embodiment of the present invention, the duty of the pattern structure included in the third area may be 0.1 or more and 1.0 or less. It is possible to implement the third area having excellent light diffraction efficiency by adjusting the duty of the pattern structure included in the third area to the foregoing range.

According to the exemplary embodiment of the present invention, it is possible to gradually increase the duty of the pattern structure from one side to the other side of the third area by setting the pitches of the two or more pattern structures to be the same and gradually increasing the width of the pattern structure in the direction from one side to the other side of the third area.

Further, similar to the third area, the first area and/or the second area included in each of the first diffraction grating layer to the third diffraction grating layer may include the pattern structure, whose duty gradually increases from one side to the other side.

An exemplary embodiment of the present invention provides a method of manufacturing a diffraction light guide plate according to an exemplary embodiment of the present invention, the method including: preparing a first diffraction substrate including a first diffraction grating layer on one surface and a second diffraction grating layer on the other surface; preparing a second diffraction substrate including a third diffraction grating layer on one surface; and attaching the first diffraction substrate and the second diffraction substrate.

According to the exemplary embodiment of the present invention, it is possible to easily manufacture the diffraction light guide plate, of which a thickness and weight decreases.

The first diffraction substrate, the second diffraction substrate, and the diffraction light guide plate manufactured by the method of manufacturing the diffraction light guide plate according to the exemplary embodiment of the present invention may be substantially the same as the first diffraction substrate, the second diffraction substrate, and the diffraction light guide plate according to the exemplary embodiment of the present invention.

According to the exemplary embodiment of the present invention, the operation of preparing the first diffraction substrate may include forming the first diffraction grating layer on one surface of a first substrate and forming the second diffraction grating layer on the other surface of the first substrate to manufacture the first diffraction substrate. Particularly, after the first diffraction grating layer is formed on one surface of the first substrate, the second diffraction grating layer may be formed on the other surface of the first substrate. Further, the first diffraction grating layer and the second diffraction grating layer may also be simultaneously formed on one surface and the other surface of the first substrate.

According to the exemplary embodiment of the present invention, the operation of preparing the first diffraction substrate may include bonding a first substrate provided with the first diffraction grating layer on one surface and an additional substrate provided with the second diffraction grating layer on one surface to manufacture a first diffraction substrate. Particularly, the first diffraction grating layer is formed on one surface of the first substrate and the second diffraction grating layer is formed on one surface of the additional substrate, and then the first diffraction substrate may be manufactured by bonding the other surface of the first substrate and the other surface of the additional substrate.

According to the exemplary embodiment of the present invention, the other surface of the first substrate and the other surface of the additional substrate may be bonded through an adhesive layer. The adhesive layer may have a light refractive index of 1.5 or more and less than 2.0. It is possible to manufacture the first diffraction substrate having excellent light diffraction efficiency by bonding the first substrate and the additional substrate by using the adhesive layer having the refractive index within the foregoing range.

According to the exemplary embodiment of the present invention, the adhesive layer may include an adhesive film or an adhesive agent. Particularly, an adhesive film having the foregoing light refractive index may be used, and an adhesive agent forming an adhesive layer having the foregoing light refractive index may be used.

According to the exemplary embodiment of the present invention, each of the first diffraction grating layer to the third diffraction grating layer may be formed by using a photo-curable resin composition and an imprinting process using an imprinting mold.

According to the exemplary embodiment of the present invention, the operation of preparing the first diffraction substrate may include applying a photo-curable resin composition on the first substrate and performing imprinting on a surface of the photo-curable resin composition by using a mold having a surface, in which a diffraction pattern is engraved. Then, the photo-curable resin composition may be photo-cured by emitting light to the photo-curable resin composition. Accordingly, the first substrate formed with the first diffraction grating layer on one surface may be manufactured. The diffraction grating pattern engraved in the mold may correspond to a pattern of the first diffraction grating layer.

According to the exemplary embodiment of the present invention, a photo-curable resin composition may be applied on the other surface of the first substrate formed with the first diffraction grating layer on one surface, and a surface of the photo-curable resin composition may be imprinted by using a mold having the surface, in which a diffraction pattern is engraved. Then, the photo-curable resin composition may be photo-cured by emitting light to the photo-curable resin composition. The diffraction grating pattern engraved in the mold may correspond to a pattern of the second diffraction grating layer. Accordingly, it is possible to manufacture the first diffraction substrate formed with the first diffraction grating layer one surface and the second diffraction grating layer on the other surface.

According to the exemplary embodiment of the present invention, the process of photo-curing the photo-curable resin composition may be simultaneously performed with the process of imprinting the mold on the surface of the photo-curable resin composition, or may also be performed after the mold is removed.

According to the exemplary embodiment of the present invention, the first diffraction grating layer may be protected during a process of forming the second diffraction grating layer on the other surface of the first substrate by attaching a release film and the like onto the first diffraction grating layer after the first diffraction grating layer is formed on one surface of the first substrate.

Further, according to the exemplary embodiment of the present invention, the photo-curable resin composition may be applied onto one surface and the other surface of the first substrate, and the surfaces of the photo-curable resin compositions applied onto one surface and the other surface of the first substrate may be simultaneously imprinted by using the mold.

According to the exemplary embodiment of the present invention, the operation of preparing the first diffraction substrate may include applying a photo-curable resin composition on the first substrate and performing imprinting on a surface of the photo-curable resin composition by using a mold having a surface, in which a diffraction pattern is engraved. Then, the first substrate formed with the first diffraction grating layer on one surface may be manufactured by photo-curing the photo-curable resin composition. The photo-curable resin composition may be applied onto the additional substrate, and a surface of the photo-curable resin composition may be imprinted by using a mold having the surface, in which a diffraction pattern is engraved. Then, the additional substrate formed with the second diffraction grating layer on one surface may be manufactured by photo-curing the photo-curable resin composition. Then, the first diffraction substrate may be manufactured by bonding the other surface of the first substrate and the other surface of the additional substrate through an adhesive layer.

According to the exemplary embodiment of the present invention, a photo-curable resin composition may be applied on the second substrate, and a surface of the photo-curable resin composition may be imprinted by using a mold having the surface, in which a diffraction pattern is engraved. The diffraction grating pattern engraved in the mold may correspond to a pattern of the third diffraction grating layer. Then, the second substrate formed with the third diffraction grating layer on one surface may be manufactured by photo-curing the photo-curable resin composition.

According to the exemplary embodiment of the present invention, the photo-curable resin composition may include a photo-curable resin including at least one of the high refractive components, such as $TiO_2$, $Al_2O_3$, $Ga_2O_3$, $TeO_2$, $ZrO_2$, $Ta_2O_5$, $Nb_2O_5$, ZnS, HfO, MoO, and CuO. Particularly, the photo-curable resin may be cured by light emission, and the photo-curable resin may include an acryl-based photo-curable resin, such as a urethane acrylate-based photo-curable resin and an epoxy acrylate-based photo-curable resin, a polyamide-based photo-curable resin, a polyimide-based photo-curable resin, a silicon-based photo-curable resin, an epoxy-based photo-curable resin, and a polyester-based photo-curable resin, but the kind of photo-curable resin is not limited.

According to the exemplary embodiment of the present invention, the photo-curable resin composition including the photo-curable resin including the high refractive component may be applied onto the substrate, and then the diffraction grating layer may be formed on the substrate by photo-curating the photo-curable resin composition. Particularly, a photo-curable resin composition including an acryl-based photo-curable resin containing $ZrO_2$ as a high refractive particle is applied by a spin-coating method, the photo-curable resin composition is dried at a temperature of about 80° C. for about three minutes, and then ultraviolet rays having an intensity of 100 mW/cm$^2$ are irradiated at a temperature of about 40° C. for 60 seconds or more to photo-cure the photo-curable resin composition.

According to the exemplary embodiment of the present invention, the light refractive index of each of the first substrate, the second substrate, and the additional substrate may be 1.5 or more and less than 2.0. As long as a substrate generally used in the art has the light refractive index having the foregoing range, the substrate may be used. Particularly, as the substrate, glass including at least one of the high refractive components, such as $TiO_2$, $Al_2O_3$, $Ga_2O_3$, $TeO_2$, $ZrO_2$, $Ta_2O_5$, $Nb_2O_5$, and ZnS, a resin film including at least one of the high refractive components, or the like may be used, but the kind of substrate is not limited.

According to the exemplary embodiment of the present invention, the mold may be manufactured in consideration of the diffraction patterns included in the first diffraction grating layer and the second diffraction grating layer. As the mold, a mold usable in the art may be used without a limit, and particularly, a hard mold including a metal or an alloy, such as nickel or a nickel alloy, and an amorphous metal, or a soft mold including polyethylene terephthalate and the like may be used. Further, the mold may be transparent.

According to the exemplary embodiment of the present invention, in order to improve contact between the surface of the photo-curable resin composition and the surface of the mold provided with the pattern when the surface of the photo-curable resin composition is imprinted by using the mold, the mold provided with a support may be used. Particularly, contact between the surface of the photo-curable resin composition and the surface of the mold provided with the pattern is improved by providing a support to the other surface of the mold, in which the pattern is engraved on one surface, thereby improving imprinting efficiency. The support may include a support layer formed of polyethylene terephthalate (PET) or urethane, and an elastic layer, which is provided on one surface of the support layer and includes polydimethylsiloxane (PDMS), but the kinds of support layer and elastic layer are not limited. Further, the support layer and the elastic layer included in the support may be transparent, and the elastic layer of the support may be provided to be positioned on the other surface of the mold.

FIG. 10 is a diagram schematically illustrating the preparation of a first diffraction substrate by using two substrates according to the exemplary embodiment of the present invention. Particularly, FIG. 10 is a diagram schematically illustrating the case where a photo-curable resin composition 700 is applied onto one surface of a first substrate 610 and one surface of an additional substrate 620 and is dried, the other surface of the first substrate 610 faces the other surface of the additional substrate 620, and then the imprinting is performed by using a mold 810, in which a pattern provided in a first diffraction grating layer is engraved on one surface and a mold 820, in which a pattern provided in a second diffraction grating layer is engraved on one surface. Referring to FIG. 10, a support including PET and PDMS and a support including urethane and PDMS are provided on the other surfaces of the molds 810 and 820, in which the patterns are not formed, respectively, to improve contact between the surface of the photo-curable resin compositions and one surfaces of the molds provided with the patterns.

According to the exemplary embodiment of the present invention, each of the first diffraction grating layer to the third diffraction grating layer may be formed by using a lithography process or a laser etch process. Particularly, the photo-curable resin composition is applied onto one surface of the first substrate and is photo-cured, and then a diffraction pattern is formed on a surface of the cured material formed on one surface of the first substrate by using a lithography process or a laser etch process to form the first diffraction grating layer on one surface of the first substrate. Identically to the method, the second diffraction grating layer may be formed on the other surface of the first substrate, and the third diffraction grating layer may be formed on one surface of the second substrate.

According to the exemplary embodiment of the present invention, in the operation of attaching the first diffraction substrate and the second diffraction substrate, the diffraction grating layer of the first diffraction substrate may be attached to be spaced apart from the second diffraction substrate by using a spacer. Particularly, one end portion of the first diffraction substrate and one end portion of the second diffraction substrate, and the other end portion of the first diffraction substrate and the other end portion of the second diffraction substrate may be connected through the spacers. As the spacer, a publicly known configuration, which is capable of connecting the first diffraction substrate and the second diffraction substrate, may be used, and a configuration having elasticity may also be used as the spacer.

According to the exemplary embodiment of the present invention, the first diffraction substrate and the second diffraction substrate may be attached in the state where the first diffraction grating layer or the second diffraction grating layer is spaced apart from the third diffraction grating layer or the other surface of the second diffraction substrate. That is, the first diffraction grating layer or the second diffraction grating layer included in the first diffraction substrate is not in contact with the third diffraction grating layer included in the second diffraction substrate or the other surface of the second diffraction substrate, and the first diffraction substrate and the second diffraction substrate may be attached through the spacer.

Another exemplary embodiment of the present invention provides a display unit including the diffraction light guide plate according to the exemplary embodiment of the present invention. The display unit may implement a provided image in the form of AR, MR, or VR.

DESCRIPTION OF REFERENCE NUMERALS

100: First diffraction substrate
200: Second diffraction substrate
310: First diffraction grating layer
320: Second diffraction grating layer
330: Third diffraction grating layer
311, 321, 331: First diffraction pattern
312, 322, 332, 332': Second diffraction pattern
313, 323, 333: Third diffraction pattern
400: Spacer 511, 521, 531: First area
512, 522, 532, 532': Second area
513, 523, 533: Third area
610: First substrate 620: Additional substrate
700: Photo-curable resin composition
810, 820: Mold

MODE FOR CARRYING OUT THE INVENTION

Hereinafter, the present invention will be described in detail based on Example. However, Examples according to the present invention may be modified into other various forms, and it is not construed that the scope of the present invention is limited to Examples described below. Examples of the present specification are provided for more completely explaining the present invention to those skilled in the art.

Example 1

A photo-curable resin composition including a photo-curable resin prepared from a composition including propyleneglycolmonomethyl ether acetate (PGMEA) as a solvent, $ZrO_2$ as high-refractive particles, dipentaerythritol hexaacrylate (DPHA) as a monomer, and Irgacure 184 as a photopolymerization initiator was prepared.

The prepared photo-curable resin composition was applied on one surface of the first substrate and one surface of an additional substrate, and was dried at a temperature of 80° C. for about three minutes. Then, imprinting was performed on a surface of the photo-curable resin composition on the first substrate by using a mold, in which a predetermined pattern of a first diffraction grating layer is engraved, and imprinting was performed on a surface of the photo-curable resin composition on an additional substrate by using a mold, in which a predetermined pattern of a second diffraction grating layer is engraved. During the imprinting process, the first substrate provided with the first diffraction grating layer and the additional substrate provided with the second diffraction grating layer were manufactured by photo-curing the photo-curable resin composition by irradiating ultraviolet rays having an intensity of 100 mw/cm² or more at a temperature of about 40° C. for 60 seconds or more. Then, the other surface of the first substrate and the other surface of the additional substrate were bonded by using an adhesive to manufacture a first diffraction substrate including the first diffraction grating layer on one surface and the second diffraction grating layer on the other surface.

The prepared photo-curable resin composition was applied onto one surface of the second substrate, and was dried at a temperature of 80° C. for about three minutes. Then, the imprinting was performed on a surface of the photo-curable resin composition on the second substrate by using a mold, in which a predetermined pattern of a third diffraction grating layer is engraved. During the imprinting process, a second substrate including the third diffraction grating layer on one surface was manufactured by curing the photo-curable resin composition by irradiating ultraviolet rays having an intensity of 100 mw/cm² or more at a temperature of about 40° C. for 60 seconds or more.

Then, the other surface of the first diffraction substrate was positioned to face the other surface of the second diffraction substrate, and then, one end portion of the first diffraction substrate and one end portion of the second diffraction substrate, and the other end portion of the first diffraction substrate and the other end portion of the second diffraction substrate were connected through spacers. Accordingly, a diffraction light guide plate including the first diffraction substrate and the second diffraction substrate was manufactured.

Analysis of cross-sections of the first diffraction grating layer and the second diffraction grating layer The cross-sections of the first diffraction grating layer and the second diffraction grating layer manufactured in Example 1 were analyzed by using an electron microscope (S-1400, Hitachi, Ltd.).

FIG. 11A is a scanning electron microscope (SEM) picture of the first diffraction grating layer according to Example 1 of the present invention, and FIG. 11B is an SEM picture of the second diffraction grating layer according to Example 1 of the present invention. Particularly, (A) of FIG. 11A is a picture obtained by photographing the first diffraction grating layer at a ratio of 5,000 times, (B) of FIG. 11A is a picture obtained by photographing the first diffraction grating layer at a ratio of 15,000 times, and (C) of FIG. 11A is a picture obtained by photographing the first diffraction grating layer at a ratio of 100,000 times. Further, (A) of FIG. 11B is a picture obtained by photographing the second diffraction grating layer at a ratio of 5,000 times, (B) of FIG. 11B is a picture obtained by photographing the second diffraction grating layer at a ratio of 15,000 times, and (C) of FIG. 11B is a picture obtained by photographing the second diffraction grating layer at a ratio of 100,000 times.

Referring to FIGS. 11A and 11B, it can be seen that it is possible to easily manufacture the diffraction light guide plate including the first diffraction substrate provided with the first diffraction grating layer and the second diffraction grating layer through the method according to the exemplary embodiment of the present invention.

The invention claimed is:

1. A diffraction light guide plate, comprising:
a first diffraction substrate; and
a second diffraction substrate provided on the first diffraction substrate, wherein the first diffraction substrate includes a first diffraction grating layer in direct contact with one surface of the first diffraction substrate and a second diffraction grating layer in direct contact with an opposite surface of the first diffraction substrate,
the second diffraction substrate includes a third diffraction grating layer in direct contact with one surface of the second diffraction substrate,
when first incident light is emitted to the first diffraction grating layer included on one surface of the first diffraction substrate for the diffraction light guide plate including the first diffraction substrate, the first diffraction grating layer separates first light having a wavelength of 550 nm or more and 700 nm or less from the first incident light,
when second incident light, in which the first light is separated from the first incident light, is emitted to the second diffraction grating layer while being reflected or totally reflected from the internal side of the first diffraction substrate, the second diffraction grating layer separates second light having a wavelength of 400 nm or more and 550 nm or less from the second incident light, and
when third incident light, in which the second light is separated from the second incident light, is emitted to the third diffraction grating layer, the third diffraction grating layer separates third light having a wavelength of 450 nm or more and 650 nm or less from the third incident light,
wherein each of the first diffraction grating layer, the second diffraction grating layer and the third diffraction grating layer includes a first area onto which light is incident, a second area in which the incident light expands and moves, and a third area from which the moved light is extracted,
wherein each of the first areas includes a first diffraction pattern, each of the second areas includes a second diffraction pattern, and each of the third areas includes a third diffraction pattern,
wherein the first diffraction pattern, the second diffraction pattern, and the third diffraction pattern of the first diffraction grating layer differ in at least one of the inclination direction, angle of inclination, depth, or width,
wherein the each of the third diffraction patterns includes an inclined pattern structure having an angle of inclination of 50° or more and less than 90° with respect to a surface of the diffraction substrate on which the each of the third diffraction patterns are formed, wherein a duty of the inclined pattern gradually increases from one end to the other end of each of the third diffraction patterns in the respective third area, and the duty of the inclined pattern is 0.1 or more and 1.0 or less,
wherein the first areas of each of the first, second and third diffraction grating layers are included at corresponding positions on each of the first, second and third diffraction grating layers, respectively, wherein third areas of each of the first, second and third diffraction grating layers are included at corresponding positions on each of the first, second and third diffraction grating layers, respectively, and wherein a depth of the inclined pattern structure gradually increases from one end of the respective third area to the other end of the respective third area.

2. The diffraction light guide plate of claim 1, wherein a thickness of each of the first diffraction substrate and the second diffraction substrate is 0.1 mm or more and 2 mm or less.

3. The diffraction light guide plate of claim 1, wherein a diffraction grating layer of the first diffraction substrate is spaced apart from the second diffraction substrate.

4. The diffraction light guide plate of claim 1, wherein a light refractive index of the third area of each of the first, second and third diffraction grating layers gradually increases from one end of the third area to the other end of the third area.

5. A method of manufacturing the diffraction light guide plate of claim 1, the method comprising:

preparing the first diffraction substrate including the first diffraction grating layer in direct contact with one surface of the first diffraction substrate and the second diffraction grating layer in direct contact with the opposite surface of the first diffraction substrate;

preparing the second diffraction substrate including the third diffraction grating layer in direct contact with the one surface of the second diffraction substrate; and attaching the first diffraction substrate and the second diffraction substrate.

6. The method of claim 5, wherein the preparing of the first diffraction substrate includes forming the first diffraction grating layer to be in direct contact with the one surface of a first substrate and forming the second diffraction grating layer to be in direct contact with the opposite surface of the first diffraction substrate.

7. The method of claim 5, wherein the preparing of the first diffraction substrate includes bonding the first substrate provided with the first diffraction grating layer directly in contact with the one surface of the first substrate, and the second substrate provided with the second diffraction grating layer directly in contact with the one surface of the second substrate that is opposite to the first substrate.

8. The method of claim 5, wherein forming each of the first, second and third diffraction grating layers includes an imprinting process using an imprinting mold and a photo-curable resin composition.

9. The method of claim 5, wherein forming each of the first, second and third diffraction grating layers includes a lithography process or a laser etch process.

10. The method of claim 5, wherein the attaching the first diffraction substrate and the second diffraction substrate includes attaching the first diffraction substrate and the second diffraction substrate so that the first diffraction grating layer of the first diffraction substrate is spaced apart from the second diffraction substrate with a spacer.

* * * * *